(12) United States Patent
Macciola et al.

(10) Patent No.: US 9,576,272 B2
(45) Date of Patent: Feb. 21, 2017

(54) SYSTEMS, METHODS AND COMPUTER PROGRAM PRODUCTS FOR DETERMINING DOCUMENT VALIDITY

(71) Applicant: Kofax, Inc., Irvine, CA (US)

(72) Inventors: Anthony Macciola, Irvine, CA (US); Jan W. Amtrup, Silver Spring, MD (US)

(73) Assignee: Kofax, Inc., Irvine, CA (US)

(*) Notice: Subject to any disclaimer, the term of this patent is extended or adjusted under 35 U.S.C. 154(b) by 0 days.

(21) Appl. No.: 14/804,278

(22) Filed: Jul. 20, 2015

(65) Prior Publication Data

US 2015/0324640 A1    Nov. 12, 2015

Related U.S. Application Data

(63) Continuation-in-part of application No. 14/588,147, filed on Dec. 31, 2014, now Pat. No. 9,342,741,
(Continued)

(51) Int. Cl.
*G06K 9/68* (2006.01)
*G06Q 10/10* (2012.01)
(Continued)

(52) U.S. Cl.
CPC .......... *G06Q 10/10* (2013.01); *G06K 9/00456* (2013.01); *G06K 9/00469* (2013.01);
(Continued)

(58) Field of Classification Search
CPC .......... G06Q 10/10; G06Q 30/04; G06K 9/18; G06K 9/22; G06K 9/00456; G06K 9/00469; G06K 9/325; G06K 9/72; H04N 1/40
(Continued)

(56) References Cited

U.S. PATENT DOCUMENTS 3,069,654 A    12/1962    Hough
4,656,665 A    4/1987    Pennebaker
(Continued)

FOREIGN PATENT DOCUMENTS

EP    0549329 A2    6/1993
EP    0767578 A2    4/1997
(Continued)

OTHER PUBLICATIONS

Final Office Action from U.S. Appl. No. 14/588,147, dated Nov. 4, 2015.
(Continued)

*Primary Examiner* — Daniel Mariam
(74) *Attorney, Agent, or Firm* — Zilka-Kotab, PC

(57) ABSTRACT

In one approach, a method includes: capturing an image of a document using a camera of a mobile device; performing optical character recognition (OCR) on the image of the document; extracting data of interest from the image based at least in part on the OCR; and validating the extracted data of interest against reference information stored on the mobile device. In another embodiment, a method includes: capturing an image of a document using a camera of a mobile device; performing optical character recognition (OCR) on the image of the document; extracting data of interest from the image based at least in part on the OCR; and validating authenticity of the document based on comparing some or all of the extracted data of interest to reference information stored on the mobile device.

18 Claims, 7 Drawing Sheets

Related U.S. Application Data which is a continuation of application No. 14/176,006, filed on Feb. 7, 2014, now Pat. No. 8,958,605, which is a continuation-in-part of application No. 13/948,046, filed on Jul. 22, 2013, now Pat. No. 8,855,425, which is a continuation of application No. 13/691,610, filed on Nov. 30, 2012, now Pat. No. 8,526,739, which is a continuation of application No. 12/368,685, filed on Feb. 10, 2009, now Pat. No. 8,345,981.

(51) Int. Cl.

| | | |
|---|---|---|
| *G06K 9/00* | (2006.01) | |
| *G06K 9/22* | (2006.01) | |
| *G06K 9/72* | (2006.01) | |
| *G06K 9/32* | (2006.01) | |
| *G06Q 30/04* | (2012.01) | |
| *G06K 9/18* | (2006.01) | |
| *H04N 1/40* | (2006.01) | |

(52) U.S. Cl.
CPC ............... *G06K 9/18* (2013.01); *G06K 9/22* (2013.01); *G06K 9/325* (2013.01); *G06K 9/72* (2013.01); *G06Q 30/04* (2013.01); *H04N 1/40* (2013.01); *G06K 2209/01* (2013.01)

(58) Field of Classification Search
USPC .................. 382/115, 209, 218, 305, 313
See application file for complete search history.

(56) References Cited

U.S. PATENT DOCUMENTS

| | | |
|---|---|---|
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,124,810 A | 6/1992 | Seto |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,293,429 A | 3/1994 | Pizano et al. |
| 5,313,527 A | 5/1994 | Guberman et al. |
| 5,317,646 A | 5/1994 | Sang, Jr. et al. |
| 5,321,770 A | 6/1994 | Huttenlocher et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,696,611 A | 12/1997 | Nishimura et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,781,665 A | 7/1998 | Cullen et al. |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,867,264 A | 2/1999 | Hinnrichs |
| 5,923,763 A | 7/1999 | Walker et al. |
| 5,937,084 A | 8/1999 | Crabtree et al. |
| 5,953,388 A | 9/1999 | Walnut et al. |
| 5,987,172 A | 11/1999 | Michael |
| 6,005,958 A | 12/1999 | Farmer et al. |
| 6,009,191 A | 12/1999 | Julier |
| 6,009,196 A | 12/1999 | Mahoney |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,839,466 B2 | 1/2005 | Venable |

(56) References Cited

U.S. PATENT DOCUMENTS

| | | |
|---|---|---|
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 6,999,625 B1 | 2/2006 | Nelson |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,054,036 B2 | 5/2006 | Hirayama |
| 7,081,975 B2 | 7/2006 | Yoda et al. |
| 7,082,426 B2 | 7/2006 | Musgrove et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Buttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,545,529 B2 | 6/2009 | Borrey et al. |
| 7,553,095 B2 | 6/2009 | Kimura |
| 7,562,060 B2 | 7/2009 | Sindhwani et al. |
| 7,580,557 B2 | 8/2009 | Zavadsky et al. |
| 7,636,479 B2 | 12/2009 | Luo et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,787,695 B2 | 8/2010 | Nepomniachtchi et al. |
| 7,937,345 B2 | 5/2011 | Schmidtler et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,094,976 B2 | 1/2012 | Berard et al. |
| 8,135,656 B2 | 3/2012 | Evanitsky |
| 8,194,965 B2 | 6/2012 | Lossev et al. |
| 8,238,880 B2 * | 8/2012 | Jin .................. H04W 12/06 340/5.83 |
| 8,239,335 B2 | 8/2012 | Schmidtler et al. |
| 8,244,031 B2 | 8/2012 | Cho et al. |
| 8,279,465 B2 | 10/2012 | Couchman |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,441,548 B1 | 5/2013 | Nechyba et al. |
| 8,452,098 B2 | 5/2013 | Nepomniachtchi et al. |
| 8,478,052 B1 | 7/2013 | Yee et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,620,058 B2 | 12/2013 | Nepomniachtchi et al. |
| 8,639,621 B1 | 1/2014 | Ellis et al. |
| 8,676,165 B2 * | 3/2014 | Cheng .................. H04L 12/581 455/412.1 |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,749,839 B2 | 6/2014 | Borrey et al. |
| 8,774,516 B2 | 7/2014 | Amtrup et al. |
| 8,813,111 B2 | 8/2014 | Guerin et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 8,879,846 B2 | 11/2014 | Amtrup et al. |
| 8,885,229 B1 | 11/2014 | Amtrup et al. |
| 8,908,977 B2 * | 12/2014 | King .................. G06K 9/00221 382/118 |
| 8,995,769 B2 * | 3/2015 | Carr .................. G06Q 10/107 382/181 |
| 9,058,515 B1 | 6/2015 | Amtrup et al. |
| 9,058,580 B1 | 6/2015 | Amtrup et al. |
| 9,141,926 B2 | 9/2015 | Kilby et al. |
| 9,311,531 B2 | 4/2016 | Amtrup et al. |
| 9,342,741 B2 | 5/2016 | Amtrup et al. |
| 9,355,312 B2 | 5/2016 | Amtrup et al. |

(56) References Cited

U.S. PATENT DOCUMENTS

| | | |
|---|---|---|
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0007683 A1 | 1/2003 | Wang et al. |
| 2003/0026479 A1 | 2/2003 | Thomas et al. |
| 2003/0044012 A1 | 3/2003 | Eden |
| 2003/0046445 A1 | 3/2003 | Witt et al. |
| 2003/0101161 A1 | 5/2003 | Ferguson et al. |
| 2003/0120653 A1 | 6/2003 | Brady et al. |
| 2003/0142328 A1 | 7/2003 | McDaniel et al. |
| 2003/0156201 A1 | 8/2003 | Zhang |
| 2003/0210428 A1 | 11/2003 | Bevlin et al. |
| 2003/0223615 A1 | 12/2003 | Keaton et al. |
| 2004/0021909 A1 | 2/2004 | Kikuoka |
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0245334 A1 | 12/2004 | Sikorski |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0193325 A1 | 9/2005 | Epstein |
| 2005/0204058 A1 | 9/2005 | Philbrick et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2006/0017810 A1* | 1/2006 | Kurzweil ............ G06K 9/325 348/207.1 |
| 2006/0023271 A1 | 2/2006 | Boay et al. |
| 2006/0031344 A1 | 2/2006 | Mishima et al. |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0159364 A1 | 7/2006 | Poon et al. |
| 2006/0161646 A1 | 7/2006 | Chene et al. |
| 2006/0195491 A1 | 8/2006 | Nieland et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256392 A1 | 11/2006 | Van Hoof et al. |
| 2006/0263134 A1 | 11/2006 | Beppu |
| 2006/0265640 A1 | 11/2006 | Albornoz et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2007/0002348 A1 | 1/2007 | Hagiwara |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0147790 A1 | 6/2008 | Malaney et al. |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0089078 A1 | 4/2009 | Bursey |
| 2009/0141985 A1 | 6/2009 | Sheinin et al. |
| 2009/0154778 A1 | 6/2009 | Lei et al. |
| 2009/0159509 A1 | 6/2009 | Wojdyla et al. |
| 2009/0175537 A1 | 7/2009 | Tribelhorn et al. |
| 2009/0214112 A1 | 8/2009 | Borrey et al. |
| 2009/0228499 A1 | 9/2009 | Schmidtler et al. |
| 2009/0285445 A1 | 11/2009 | Vasa |
| 2009/0324025 A1* | 12/2009 | Camp, Jr. ............ G07C 9/00007 382/124 |
| 2010/0060910 A1 | 3/2010 | Fechter |
| 2010/0060915 A1 | 3/2010 | Suzuki et al. |
| 2010/0082491 A1* | 4/2010 | Rosenblatt ............ G06Q 10/02 705/65 |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0232706 A1 | 9/2010 | Forutanpour |

(56) References Cited

U.S. PATENT DOCUMENTS

| | | |
|---|---|---|
| 2010/0280859 A1 | 11/2010 | Frederick, II |
| 2011/0013039 A1 | 1/2011 | Aisaka et al. |
| 2011/0055033 A1 | 3/2011 | Chen et al. |
| 2011/0116716 A1 | 5/2011 | Kwon et al. |
| 2011/0145178 A1 | 6/2011 | Schmidtler et al. |
| 2011/0182500 A1 | 7/2011 | Esposito et al. |
| 2011/0196870 A1 | 8/2011 | Schmidtler et al. |
| 2011/0246076 A1 | 10/2011 | Su et al. |
| 2011/0249905 A1 | 10/2011 | Singh et al. |
| 2012/0077476 A1* | 3/2012 | Paraskevakos .... G06Q 20/4016 455/414.2 |
| 2012/0092329 A1 | 4/2012 | Koo et al. |
| 2012/0114249 A1 | 5/2012 | Conwell |
| 2012/0116957 A1 | 5/2012 | Zanzot et al. |
| 2012/0134576 A1 | 5/2012 | Sharma et al. |
| 2012/0162527 A1 | 6/2012 | Baker |
| 2012/0194692 A1 | 8/2012 | Mers et al. |
| 2012/0272192 A1 | 10/2012 | Grossman et al. |
| 2012/0284122 A1 | 11/2012 | Brandis |
| 2013/0004076 A1 | 1/2013 | Koo et al. |
| 2013/0022231 A1 | 1/2013 | Nepomniachtchi et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0142402 A1 | 6/2013 | Myers et al. |
| 2013/0152176 A1 | 6/2013 | Courtney et al. |
| 2013/0182002 A1 | 7/2013 | Macciola et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0230246 A1 | 9/2013 | Nuggehalli |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2013/0329023 A1 | 12/2013 | Suplee, III et al. |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |
| 2014/0254887 A1 | 9/2014 | Amtrup et al. |
| 2014/0270349 A1 | 9/2014 | Amtrup et al. |
| 2014/0270536 A1 | 9/2014 | Amtrup et al. |
| 2015/0040001 A1* | 2/2015 | Kannan ................. G06F 17/248 715/243 |
| 2015/0170085 A1 | 6/2015 | Amtrup et al. |
| 2015/0339526 A1 | 11/2015 | Macciola et al. |

FOREIGN PATENT DOCUMENTS

| | | |
|---|---|---|
| EP | 0936804 A2 | 8/1999 |
| EP | 1128659 A1 | 8/2001 |
| EP | 1317133 A1 | 6/2003 |
| EP | 1422920 A2 | 5/2004 |
| EP | 1956518 A1 | 8/2008 |
| EP | 1959363 A2 | 8/2008 |
| EP | 1976259 A1 | 10/2008 |
| EP | 2472372 A1 | 7/2012 |
| JP | H0962826 A | 3/1997 |
| JP | H09116720 A | 5/1997 |
| JP | 2000067065 A | 3/2000 |
| JP | 2000103628 A | 4/2000 |
| JP | 2000354144 A | 12/2000 |
| JP | 2001309128 A | 11/2001 |
| JP | 2002024258 A | 1/2002 |
| JP | 2002519766 A | 7/2002 |
| JP | 2002312385 A | 10/2002 |
| JP | 2003091521 A | 3/2003 |
| JP | 2003196357 A | 7/2003 |
| JP | 2003234888 A | 8/2003 |
| JP | 2003303315 A | 10/2003 |
| JP | 2005018678 A | 1/2005 |
| JP | 2005085173 A | 3/2005 |
| JP | 2005173730 A | 6/2005 |
| JP | 2006209588 A | 8/2006 |
| JP | 2006330863 A | 12/2006 |
| JP | 2008134683 A | 6/2008 |
| JP | 2012517637 A | 8/2012 |
| TW | 401553 B | 8/2000 |
| WO | 9604749 A1 | 2/1996 |
| WO | 9847098 A1 | 10/1998 |
| WO | 9967731 A1 | 12/1999 |
| WO | 02063812 A2 | 8/2002 |
| WO | 2004053630 A2 | 6/2004 |
| WO | 2006104627 A1 | 10/2006 |
| WO | 2007081147 A1 | 7/2007 |
| WO | 2007082534 A1 * | 7/2007 |
| WO | 2008008142 A2 | 1/2008 |
| WO | 2010030056 A1 | 3/2010 |

OTHER PUBLICATIONS

Non-Final Office Action from U.S. Appl. No. 14/283,156, dated Dec. 1, 2015.

Non-Final Office Action from U.S. Appl. No. 14/588,147, dated Jun. 3, 2015.

Notice of Allowance from Japanese Patent Application No. 2014-005616, dated Jun. 12, 2015.

Office Action from Japanese Patent Application No. 2014-005616, dated Oct. 7, 2014.

Notice of Allowance from U.S. Appl. No. 14/588,147, dated Jan. 14, 2016.

Notice of Allowance from U.S. Appl. No. 14/283,156, dated Mar. 16, 2016.

Summons to Attend Oral Proceedings from European Application No. 10741580.4, dated Jun. 7, 2016.

Extended European Search Report from European Application No. 14775259.6, dated Jun. 1, 2016.

Notice of Allowance from U.S. Appl. No. 14/078,402, dated Feb. 26, 2014.

Non-Final Office Action from U.S. Appl. No. 14/078,402, dated Jan. 30, 2014.

Notice of Allowance from U.S. Appl. No. 14/175,999, dated Aug. 8, 2014.

Non-Final Office Action from U.S. Appl. No. 14/175,999, dated Apr. 3, 2014.

Notice of Allowance from U.S. Appl. No. 13/802,226, dated Jan. 29, 2016.

Non-Final Office Action from U.S. Appl. No. 13/802,226, dated Sep. 30, 2015.

Final Office Action from U.S. Appl. No. 13/802,226, dated May 20, 2015.

Non-Final Office Action from U.S. Appl. No. 13/802,226, dated Jan. 8, 2015.

Non-Final Office Action from U.S. Appl. No. 14/209,825, dated Apr. 14, 2015.

Final Office Action from U.S. Appl. No. 14/209,825, dated Aug. 13, 2015.

Notice of Allowance from U.S. Appl. No. 14/209,825, dated Oct. 28, 2015.

International Search Report and Written Opinion from International Application No. PCT/US2014/026569, dated Aug. 12, 2014.

(56) References Cited

OTHER PUBLICATIONS

Gllavata, et al., "Finding Text in Images via Local Thresholding," International Symposium on Signal Processing and Information Technology, Dec. 2003, pp. 539-542.

Zunino, et al., "Vector Quantization for License-Plate Location and Image Coding," IEEE Transactions on Industrial Electronics, vol. 47, Issue 1, Feb. 2000, pp. 159-167.

Bruns, E. et al., "Mobile Phone-Enabled Museum Guidance with Adaptive Classification," Computer Graphics and Applications, IEEE, vol. 28, No. 4, Jul.-Aug. 2008, pp. 98, 102.

Tzotsos, A. et al., "Support vector machine classification for object-based image analysis," Object-Based Image Analysis, Springer Berlin Heidelberg, 2008, pp. 663-677.

Vailaya, A. et al., "On Image Classification: City Images vs. Landscapes," Pattern Recognition, vol. 31, No. 12, Dec. 1998, pp. 1921-1935.

Extended European Search Report from European Application No. 14773721.7, dated May 17, 2016.

Gonzalez, R. C. et al., "Image Interpolation", Digital Image Processing, Third Edition, 2008, Chapter 2, pp. 65-68.

Kim, D. et al., "Location-based large-scale landmark image recognition scheme for mobile devices," 2012 Third FTRA International Conference on Mobile, Ubiquitous, and Intelligent Computing, IEEE, 2012, pp. 47-52.

Sauvola, J. et al., "Adaptive document image binarization," Pattern Recognition, vol. 33, 2000, pp. 225-236.

Tsai, C., "Effects of 2-D Preprocessing on Feature Extraction: Accentuating Features by Decimation, Contrast Enhancement, Filtering," EE 262: 2D Imaging Project Report, 2008, pp. 1-9.

\* cited by examiner

SYSTEMS, METHODS AND COMPUTER PROGRAM PRODUCTS FOR DETERMINING DOCUMENT VALIDITY

PRIORITY APPLICATIONS

This application is a continuation-in-part of U.S. patent application Ser. No. 14/588,147, filed Dec. 31, 2014, which is a continuation of U.S. patent application Ser. No. 14/176,006, filed Feb. 7, 2014 (issued as U.S. Pat. No. 8,958,605), which is a continuation-in-part of U.S. patent application Ser. No. 13/948,046, filed Jul. 22, 2013 (issued as U.S. Pat. No. 8,855,425), which is a continuation of U.S. patent application Ser. No. 13/691,610, filed Nov. 30, 2012 (issued as U.S. Pat. No. 8,526,739), which is a continuation of U.S. patent application Ser. No. 12/368,685, filed Feb. 10, 2009 (issued as U.S. Pat. No. 8,345,981), all of which are herein incorporated by reference.

FIELD OF THE INVENTION

The present invention relates to document analysis systems, methods, and computer program products, and more particularly, this invention relates to systems, methods, and computer program products for determining validity of information obtained via a mobile device, especially via capturing and/or processing image data using a mobile device.

BACKGROUND OF THE INVENTION

In present practice, mobile devices take an increasingly prominent role in conducting various business transactions, and are increasingly preferred as a device for facilitating capture and submission of data necessary to conduct the corresponding business transaction. In many approaches, capture and submission involves the imaging of one or more documents, processing the image to extract necessary data therefrom, and submitting the data to a workflow configured to conduct/complete the business transaction using the data.

However, in many instances the captured image data are insufficient to allow extraction of the necessary data. For example the image may be of insufficient quality (e.g. text or symbols are obscured) due to blur, insufficient/improper lighting, perspective distortion, and other similar challenges unique to image capture using a mobile device (e.g. as opposed to a traditional flat-bed scanner or multifunction peripheral).

For this reason, most conventional image processing techniques attempt to ensure adequate image quality pre-capture and/or improve image quality post-capture to facilitate the extraction process. However, some images are simply insufficient for accurate, reliable data extraction.

Even under circumstances where the image quality is adequate or superior, certain types of documents do not lend to facile data extraction, e.g. where a document depicts a particularly complex background with data of interest (e.g. text, symbols) overlayed thereon, or depicts data of interest overlaying or in proximity to a background texture having similar optical characteristics (e.g. color, intensity, etc.) as the data of interest. In each of these situations, it may be impossible to accurately extract some or all of the data of interest.

Certain approaches, including those disclosed in U.S. Pat. No. 8,345,981, from which this application claims priority, address the above challenge via validation techniques that verify extracted data using information obtained from a document complementary to the imaged document. Exemplary complementary documents include an invoice and a purchase order, proof of delivery, quote, etc.

While the above validation techniques are reliable and advantageously produce highly accurate extraction results (including correcting errors in initial extraction attempts), the reliance on complementary documents presents a limitation in that the validation engine/technique must have access to complementary information, requiring storage, indexing, etc. thereof and consuming computational resources to obtain and locate necessary complementary information and perform the required comparison. In practical terms, this means the user must either manually or otherwise (e.g. via image-based data extraction) enter the "reference" information prior to comparison.

While pervasive data connections prevalent today obviate the need to store this potentially copious reference information directly on a mobile device, the mobile device must make a connection to a remote resource hosting the reference information if not stored locally. Accordingly, document-based validation techniques, while reliable and suitable for accomplishing the desired extraction accuracy and reliability, have a tendency to introduce additional time and cost to the validation process.

Therefore, there is a current need for an improved method of automatic business transaction document validation using mobile devices without relying on complementary documents or remote resources as a source of reference information.

SUMMARY

In one approach, a method includes: capturing an image of a document using a camera of a mobile device; performing optical character recognition (OCR) on the image of the document; extracting data of interest from the image based at least in part on the OCR; and validating the extracted data of interest against reference information stored on the mobile device.

In another embodiment, a method includes: capturing an image of a document using a camera of a mobile device; performing optical character recognition (OCR) on the image of the document; extracting data of interest from the image based at least in part on the OCR; and validating authenticity of the document based on comparing some or all of the extracted data of interest to reference information stored on the mobile device.

In yet another embodiment, a method includes: receiving a request to perform an operation using a mobile device, the operation requiring authentication; in response to receiving the request, capturing an image of a document using the mobile device, the document depicting identifying information; extracting the identifying information from the image of the document using the mobile device; validating the identifying information extracted from the image of the document against identifying information corresponding to an owner of the mobile device; determining an immutable identifier associated with the mobile device used to capture the image of the document; validating the immutable identifier associated with the mobile device used to capture the image of the document with an immutable identifier associated with the identifying information corresponding to the owner of the mobile device; and authenticating the operation in response to determining both: the identifying information extracted from the image of the document matches the identifying information corresponding to the owner of the mobile device; and the immutable identifier associated with the mobile device used to capture the image of the document matches the immutable identifier associated with the identifying information corresponding to the owner of the mobile device.

Systems and computer program products for providing, performing, and/or enabling the methodology presented above are also presented.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
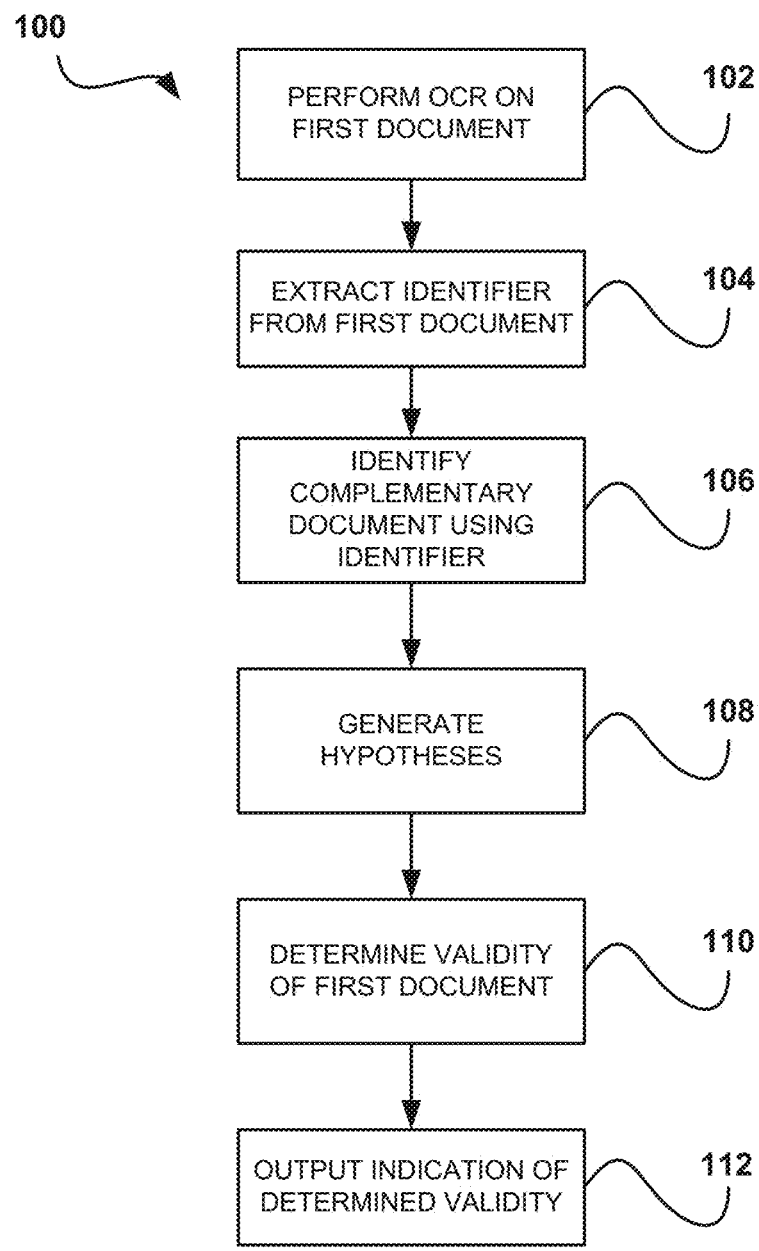
FIG. 1 is a method for determining document validity in accordance with one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

It must also be noted that, as used in the specification and the appended claims, the singular forms "a," "an" and "the" include plural referents unless otherwise specified.

In one approach, a method includes: capturing an image of a document using a camera of a mobile device; performing optical character recognition (OCR) on the image of the document; extracting data of interest from the image based at least in part on the OCR; and validating the extracted data of interest against reference information stored on the mobile device.

In another embodiment, a method includes: capturing an image of a document using a camera of a mobile device; performing optical character recognition (OCR) on the image of the document; extracting data of interest from the image based at least in part on the OCR; and validating authenticity of the document based on comparing some or all of the extracted data of interest to reference information stored on the mobile device.

In yet another embodiment, a method includes: receiving a request to perform an operation using a mobile device, the operation requiring authentication; in response to receiving the request, capturing an image of a document using the mobile device, the document depicting identifying information; extracting the identifying information from the image of the document using the mobile device; validating the identifying information extracted from the image of the document against identifying information corresponding to an owner of the mobile device; determining an immutable identifier associated with the mobile device used to capture the image of the document; validating the immutable identifier associated with the mobile device used to capture the image of the document with an immutable identifier associated with the identifying information corresponding to the owner of the mobile device; and authenticating the operation in response to determining both: the identifying information extracted from the image of the document matches the identifying information corresponding to the owner of the mobile device; and the immutable identifier associated with the mobile device used to capture the image of the document matches the immutable identifier associated with the identifying information corresponding to the owner of the mobile device.

Several embodiments of document-based validation will now be described, in accordance with the presently disclosed inventive concepts.

The receiving party, in one approach, has to validate the content of the received document by comparing the document's content with its view of the transaction, which in most cases is stored electronically in a database; i.e., the receiver has to retrieve or extract the information from the received document and compare it to the corresponding information stored in its database. This, for example, can be achieved by a human reading the document, encoding its data, and comparing it to the corresponding content of the receiver's database. The extraction of the information can be, at least to some extent, automated by utilizing technologies that automatically extract the relevant information from the document.

Today many documents still are received on paper and are built for human readability. The layout and the forms of the documents differ vastly between senders and are loosely structured, making the automatic extraction and recognition of the relevant information using prior art methods very challenging and inaccurate. One way of extracting the information from a piece of paper is by the use of a program that first transforms the paper image into text, then navigates through the text and performs the extraction of the needed fields. The most advanced of these programs look for special features of the text or image to locate the relevant information. This requires significant knowledge of the document structure and the document language.

To finalize the validation, the extracted data are passed on to a person or a program that compares the extracted data with the content of the receiver database, corrects the errors, and validates the transaction. In order to achieve an effective automatic comparison of the extracted data to the content of the database, one has to first resolve semantic differences between the sender's and the receiver's language. There often exist many subtle differences in language, making direct and hence automatic comparisons ineffective. For example, the sender and the receiver might use different units resulting in different values that cannot be directly compared. Thus, data normalization that translates the sender's language to the receiver's language in his database has to occur prior to the automatic comparison to achieve a satisfactory automation rate.

An alternative process to validate business transactions is to utilize an electronic data interchange (EDI) which allows a direct, i.e. automatic, comparison and, thus, validation, of the transaction as understood by the parties involved without having to extract or to normalize the data. EDI achieves this level of automation by solving up-front the data normalization problem through the use of standardized document forms for the information exchange. The set-up of these forms is time- and cost-intensive, resulting in a process that does not adapt easily to a changing environment.

In one embodiment, an automatic business transaction validation process allows an automatic transaction validation level that comes close to EDI without the need of manually defining standardized document forms. This is achieved by going beyond the sequential process of information extraction, followed by data normalization and then comparison to the receiver's database as described above. The new process utilizes all information available simultaneously to validate the transaction. The different sources of information are the received document, the receiver's expectation of the transaction as stored in his database, and business rules pertaining to the specific transaction. The new process simultaneously analyzes the information from these sources and uses the complementary information to validate the interaction.

Specifically, it allows to automatically correct extraction and OCR errors as well as to automatically normalize the data yielding a highly efficient comparison of the received document to the receiver's database and, thus, results in an efficient automatic validation of the transaction. In addition, over time the process is able to learn data formatting specific to a sender, which in turn improves the level of automatic transaction validation for this specific sender. In summary, the new process allows out of the box automatic transaction validation independent of the source of the received documents (paper or electronic). Over time the process allows to automatically build highly specific data normalization for each receiver. In essence the new process generates automatically the standardized document form used by EDI on the receiver side.

In one embodiment, a paper invoice validation process includes the following steps. First, a paper invoice is scanned. Next, Optical Character Recognition (OCR) is applied to the scanned invoice. Additionally, information is extracted from the invoice. Examples of extracted invoice-header information are invoice-number, total amount charged, name and address of sender. Extracted information may also include an address which may not necessarily be a sender's address, but instead an address relating to a sender, for example an address of a sender's agent responsible for dispatching documents, an address of an intermediate recipient of the document (e.g. a courier or other mail handling facility, professional, or service, etc.), or any address that may be associated with a sender's address, for example an address associated with a sender's address in a relational database, in various approaches. The extraction of line item information like quantity, description, unit price, and total charge of line item is difficult to perform effectively and reliably. Accordingly, line item extraction may often be skipped.

Further, the extracted information is manually validated. If necessary, OCR errors and the labels assigned by the extractor to specific fields are corrected. For example, it is determined whether the number identified by the extractor to be the purchase order number is actually the customer number. Further still, the content of extracted information is validated by matching against the purchase order. For example, the total amount charged as extracted from the invoice may be matched to the total amount ordered in the purchase order. Also, the invoice is validated by checking validated information against invoice validation rules.

However, several challenges arise with this process. First, the set-up of an effective and reliable automatic extraction system is time intensive. Especially, as mentioned above, the extraction of line items is difficult. Automatic systems for line item extraction often rely on template-extraction, with the need of having a custom-built template for every vendor. Yet the information held by the line items is important to validate the invoice.

Additionally, for the validation of the invoice, a large portion of the extracted information may be irrelevant. Given the described process, the knowledge of which information is important for invoice validation and which information can be disregarded is not available to the operator responsible for validating the extracted information. As a result, the operator often validates and corrects more information than is actually needed. Further, manual validation of the content is time intensive. Automated validation of the content requires a set-up process in order to handle semantic differences between the invoice and the purchase order information. For example, the units might differ between the invoice and the purchase order. In short, one may have to normalize the invoice data in order to achieve an effective automated matching. The set-up of the data normalization is time and labor-intensive. For every supplier specific data normalization is required. Similarly, description of the ordered goods can vary substantially between the invoice and the purchase order. For example, a ninety degree connection pipe might be described as an elbow-connection pipe on the invoice and a right angle connection pipe on the purchase order.

The result of these challenges and problems is that automatic invoice validation is often ineffective and only applicable to a small portion of the incoming invoices, especially when also line item information is needed for the invoice validation. One can further improve the process by using electronic invoices, which effectively eliminate the first two challenges described above. For electronic invoices the data normalization step remains for automated content validation.

One disadvantage of the above invoice validation process is its sequential nature that processes one source of information at a time independent from the other sources of available information. For example, given a scanned paper invoice, the OCR step tries to find the most likely character sequence given the input of scanned pixels. The OCR step does not take into account the information from extraction and the information from validating the extracted content by matching to the purchase order. Obviously, this additional information constrains the possible character sequences and can therefore improve the OCR step. Business rules are another source of additional information that can benefit the OCR step, the extraction step, as well as the data normalization step. For invoices, an exemplary business rule is that the total price of a line item should be equal to the quantity delivered of the line item times the unit price. By utilizing this information in the validation through matching steps, one can, for example, disambiguate unit differences between the invoice and the purchase order. These are just a few out of many examples that illustrate the advantage of simultaneously leveraging additional information in the validation process.

In contrast to the aforementioned process, the invoice validation process detailed below leverages several or all available sources of information simultaneously to determine the invoice's validity. In general, the sources of available information include the invoice itself, the corresponding purchase order, delivery notes, and business rules. The invoice validation process takes the information from OCR, extraction, validation of the extracted content by matching to the purchase order, and business rules. It evaluates the hypotheses allowed under the combined constraints of the given information and as a result gives a confidence score that indicates the validity of the invoice. In addition, the process also flags potential problems. For example, line items on the invoice that do not match to any position in the purchase order, under delivery, over delivery, price differences between the invoice and the purchase order, and so forth.

FIG. 1 shows a method 100 for determining document validity. It should be noted that the method 100 may be carried out in any desired environment.

As shown in operation 102, optical character recognition (OCR) is performed on a scanned image of a first document, which may be a paper document used as part of an overall transaction. The first document may include any physical representation of handwritten, typewritten or printed text. For example, the first document may include an invoice, a receipt, a bill, a sales order document, an insurance claim document, etc. In another example, the first document may include an explanation of benefits document, a medical insurance document, etc.

Additionally, in one embodiment, the scanned image may be generated by scanning the first document. For example, the document may be scanned using a personal or commercial hardware scanning device, using scanning software, etc.

Further, the scanned image may include any image that results from the scanning of a document. For example, the scanned image may include a JPEG image, a bitmap image, a TIFF image, a RAW image, etc. Of course, however, the scanned image may include any image type. Additionally, in the context of the current embodiment, optical character recognition may include any mechanical or electronic translation of the scanned image into machine-editable text.

It should be noted that the OCR step above may not need to be performed in particular circumstances. For example, in one instance, then first document may include an electronic document.

Additionally, as shown in operation 104, an identifier is extracted from the first document. In the context of the current embodiment, the identifier may include any aspect of the first document that can be used for purposes of identification. For example, the identifier may include a purchase order number, a heading of a document, a title of a document, a file name of an OCRed version of a document, etc. In one embodiment, the identifier may be extracted from the scanned and OCRed version of the first document.

In another embodiment, the identifier may be extracted from the first document by scanning one or more portions of the first document. In still another embodiment, the identifier may be extracted simultaneously with the OCRing of the document. In yet another embodiment, the identifier may be manually extracted. Of course, however, the identifier may be extracted from the first document in any manner.

Moreover, in an alternate approach, rather than extracting an identifier from the first document, the identifier may be obtained and/or input from some other source, e.g., from a user who inputs the identifier; from scanning a bar code on the first document; from a file name of the electronic image of the first document; etc.

An additional aspect of the presently disclosed inventive concepts may include utilizing data other than those data extracted from the document as the identifier. For example, in one approach the identifier may be the entire image of the document, e.g. raw image data "as-captured" using the capture device, or an entire image having been subjected to an extraneous processing operation, such as cropping to remove background, illumination correction (e.g. gamma balancing or adjustment), color depth reduction or conversion (e.g. converting a color image to grayscale or from one color coding scheme (e.g. RGB) to another (e.g. CMYK), etc. as would be understood by one having ordinary skill in the art upon reading the present descriptions.

A still further additional aspect of the presently disclosed techniques includes utilizing as the identifier an entirety of textual information identified and/or extracted from the document (e.g. via OCR). This exemplary approach may be particularly advantageous in embodiments subsequently employing fuzzy matching to validate a document, as described in further detail below. For example, in one embodiment utilizing an entirety of the textual information identified in the first document may be advantageous because the fuzzy matching process is provided more data from which to characterize and/or validate the document, enabling a more robust analysis of the content (e.g. textual information per se) and/or context of the document (e.g. the intended origin of the document, intended destination of the document, intended purpose of the document, etc. as would be understood by one having ordinary skill in the art upon reading the present descriptions).

Further, as shown in operation 106, a complementary document (or documents) associated with the first document is identified using the identifier. In the context of the current disclosures, the complementary document may include any document that is related in some way to the first document. For example, the complementary document may include at least one of a purchase order, a memorandum, a delivery note, etc. In another embodiment, the complementary document may have a relationship with the first document. For example, the complementary document may include a purchase order related to the first document, where the first document is an invoice.

In another embodiment, the complementary document may be identified by comparing the identifier against a database, repository, etc. For example, a purchase order may be identified by comparing a purchase order number against a purchase order repository. In yet another embodiment, the complementary document may be retrieved. For example, the complementary document may be retrieved from the database, repository, etc.

Also, as an option, the identifier may be additionally determined using an additional document that links the first document to the complementary document. For example, a vendor identifier may be extracted from an additional document that links a list of open purchase order numbers with identifiers of vendors.

Further still, as shown in operation 108, a list of hypotheses mapping the first document to the complementary document are generated using textual information from the first document, textual information from the complementary document, and predefined business rules. In one embodiment, the textual information from the first document and from the complementary document may include numerical information, text, a symbol, etc. For example, the textual information may include a description of goods, a line item, a header field item, a unit price, a quantity of goods, an extended price, etc.

In another embodiment, some textual information may be missing from the first document. For example, there may have been an error with OCRing. In response, columns of the first document may be validated in order to fill in any gaps, and operations such as a square balance may be performed in order to obtain correct textual information from the first document.

In yet another embodiment, a term on the first document may be correlated to a different term on the complementary document as referring to a same thing. For example, different entities, such as suppliers, customers, etc., may use a different description or different language for descriptions of products, units of measure, etc. In another embodiment, a closest match may be determined for the term on the first document if no direct correlation can be found. Additionally, the correlation of the terms may be stored in a database. For example, a translation database may be constructed on-the-fly during the generation of the list of hypotheses for later use.

In addition, the list of hypotheses may be generated using non-textual information from the first document and the complementary document, such as lines, colors, etc. Further, the list of hypotheses may be generated using location information from the first document and the complementary document. For example, the location information may include a location of textual information within the first document or complementary document. This location information may assist in generating the list of hypotheses. For example, the location of textual information that is known to be correct may be used to determine whether an error exists with other textual information.

In another embodiment, the hypotheses may include any correspondence between one or more items of textual information of the first document and the corresponding document. For example, the hypotheses may include a match between textual information from the first document and textual information from the corresponding document. Further, the predefined business rules may include any predetermined rules relating to a business. In one embodiment, the predefined business rules may relate to the first document or the complementary document. For example, the predefined business rules may include a rule that a total price of a line item is equal to a quantity multiplied by a unit price. In another example, the predefined business rules may include a rule that all line items have to equal a subtotal of the first document.

In addition, an expectation or other constraints may be used in the generation of the list of hypotheses. For example, an expectation from an ERP system disclosing that a particular amount of a certain product is to be expected may be used.

In one exemplary embodiment, any fields that potentially match between the first document and the complementary document are selected as potential fields for generating hypotheses. Additionally, a single field may have multiple potential corresponding hypotheses. Once all potentially matching fields have been determined, a structure of the first document and/or the complementary document is determined and the fields are grouped into logical order. For example, the fields may be grouped in a "nearest neighbor" manner. In another example, the fields may be grouped as a description, a quality, a price, a total, etc. Further, the predefined business rules are then used to confirm the validity of the fields. For example, a predefined business rule may confirm that an individual amount field multiplied by an individual cost field equals a total cost field. In this way, accurate hypotheses may be generated using little reconstruction or extraction.

In another exemplary embodiment, extraction is run over the OCRed version of the first document in order to provide textual information as well as an initial idea about each field. After an analysis utilizing the extracted textual information, the predefined business rules, and the complementary document, the extracted textual information is altered. For example, numbers, letters, and other field items are altered according to information obtained from the predefined business rules and the complementary document. After the alteration has occurred, an additional analysis is performed utilizing the altered extracted textual information, the predefined business rules, and the complementary document. In this way, the extracted textual information may be fine-tuned to more accurately relate to the complementary document.

In yet another exemplary embodiment, extraction is run over the OCRed version of the first document in order to identify all lines and groups of lines representative of line items. Additionally, a cross-correlation is performed between the complementary document and the extracted textual information from the first document. Further, the first document is reconstructed using the cross-correlation.

In another embodiment, OCR errors in the first document may be corrected using at least one of the textual information from the complementary document and the predefined business rules. Additionally, in another embodiment, data from the first document may be normalized using at least one of the textual information from the complementary document and the predefined business rules. Further, in yet another embodiment, data from the complementary document may be normalized using at least one of the textual information from the first document and the predefined business rules. For example, normalization may include converting grams to kilograms, ounces to grams, dollars to euro, etc.

In addition, as shown in operation 110, a validity of the first document is determined based on the hypotheses. In the context of the current embodiment, the validity may include an indication of whether the first document is sufficiently related to the complementary document. For example, the validity may include an indication that the first document matches the complementary document. Additionally, the validity may be determined by analyzing the hypotheses. In another embodiment, the determination may be additionally based on a confidence level of the hypotheses.

Further, in one embodiment, an alert may be generated upon encountering a potential problem when determining the validity of the first document. For example, the alert may include an identification of a mismatch in expected similar or identical values in the first and complementary documents. Additionally, in another embodiment, user input may be received indicating at least one of a correction and a validation of items such as a line item, header field item, etc. of the first document.

Further still, in another embodiment, determining the validity of the first document may include automatically estimating values for expected or actual line items, header field items, etc. in the first document. Also, determining the validity of the first document may include automatically correcting values for expected or actual line items, header field items, etc. in the first document based on at least one of the textual information from the complementary document and the business rules. In yet another embodiment, the first document may be reconstructed using the hypotheses and business rules, wherein the determining the validity step analyzes the reconstructed first document. As an option, determining the validity of the first document may include globally validating the textual information from the first document. For example, each line item of an invoice may be globally validated.

In still another embodiment, upon determining that the first document is valid, knowledge may be generated based on the hypotheses generated. For example, the generating the knowledge may include using transduction. Any transductive method known in the art can be used. Several transductive methods which may be used in various embodiments are set forth in U.S. Patent Application Pub. No. US 2008-0097936 A1 to Schmidtler et al., filed May 23, 2007, and which is herein incorporated by reference.

In one exemplary embodiment, once extracted textual information from the first document has been later verified by an individual, or the extracted textual information has been verified by a computer by the determination of a perfect match, the verification is sent to the extractor. In this way, the extractor "learns" from the verified information and can apply the verified information to future extraction and analysis.

Furthermore, as shown in operation 112, an indication of the determined validity is output. The output indication may include text, an image, a sound, or any other indication representative of the determined validity. For example, the indication may be output to a graphical display device, etc. Moreover, the indication may be output to, and stored on, a storage medium, e.g., of a type known in the art, such as RAM, ROM, hard drive, etc. In this way, the first document may be validated straight through, in most instances without human intervention, and with accurate knowledge of what is not valid in the first document. Additionally, in one embodiment, the determined validity may be used to validate a business transaction.

Additionally, a reconciliation screen may be output to a user upon failing to determine that the first document is valid or determining that the first document is invalid. For example, if one or more errors in the first document result in an unresolvable match with the complementary document, the errors are represented in the reconciliation screen, where a human operator (for example, an employee of the customer or the supplier) may view the errors and correct the first document in order to assist in the determination of the validity of the first document. The human operation may be notified via a message, e.g. an electronic mail message, that unresolvable errors exist with the first document. After human correction has been performed, the method may then be repeated on the corrected first document.

In another embodiment, a notification to access the reconciliation screen may be sent to a sender of the first document. Further, a modification to the first document may be received by a user viewing the reconciliation screen. Further still, re-validation of the modified first document may be attempted.

The methodology presented herein may be repeated for sequential documents, which may or may not relate to the same transaction. For example, assume that a second document is part of the same transaction as a first document. After determining the validity of the first document, the validity of a second document may be determined using the original complementary document again, and/or using the first document as the complementary document. Thus, an illustrative sequence may be to run the method of FIG. 1 to validate the first document, then perform OCR on a scanned image of a second document, and extract an identifier from the second document. A second complementary document associated with the second document is identified. As noted above, the second complementary document may be the same as that used to validate the first document, and/or the validated first document may be used as the second complementary document. In another approach, the second complementary document is some other document altogether. A list of hypotheses mapping the second document to the second complementary document is generated using: textual information from the second document, textual information from the second complementary document, and predefined business rules. A validity of the second document is determined based on the hypotheses, and an indication of the determined validity of the second document is output.

In one example, the first document may be an invoice, the validity of which is determined using an associated purchase order as the complementary document. The associated proof of delivery is also to be validated. However, assume it is difficult to validate the proof of delivery against the purchase order due to variations in the way quantities, costs, etc. are shown on the two documents. Once the invoice has been validated, it may be used as the complementary document to validate the proof of delivery.

Along a similar line, the general method may be performed to again attempt to determine the validity the first document, except this time a different complementary document is used. This approach may be useful for providing a higher confidence of the validity of the first document by providing two or more determinations of validity. This approach may also be used when a first attempt at validating the document fails.

Figure 2:
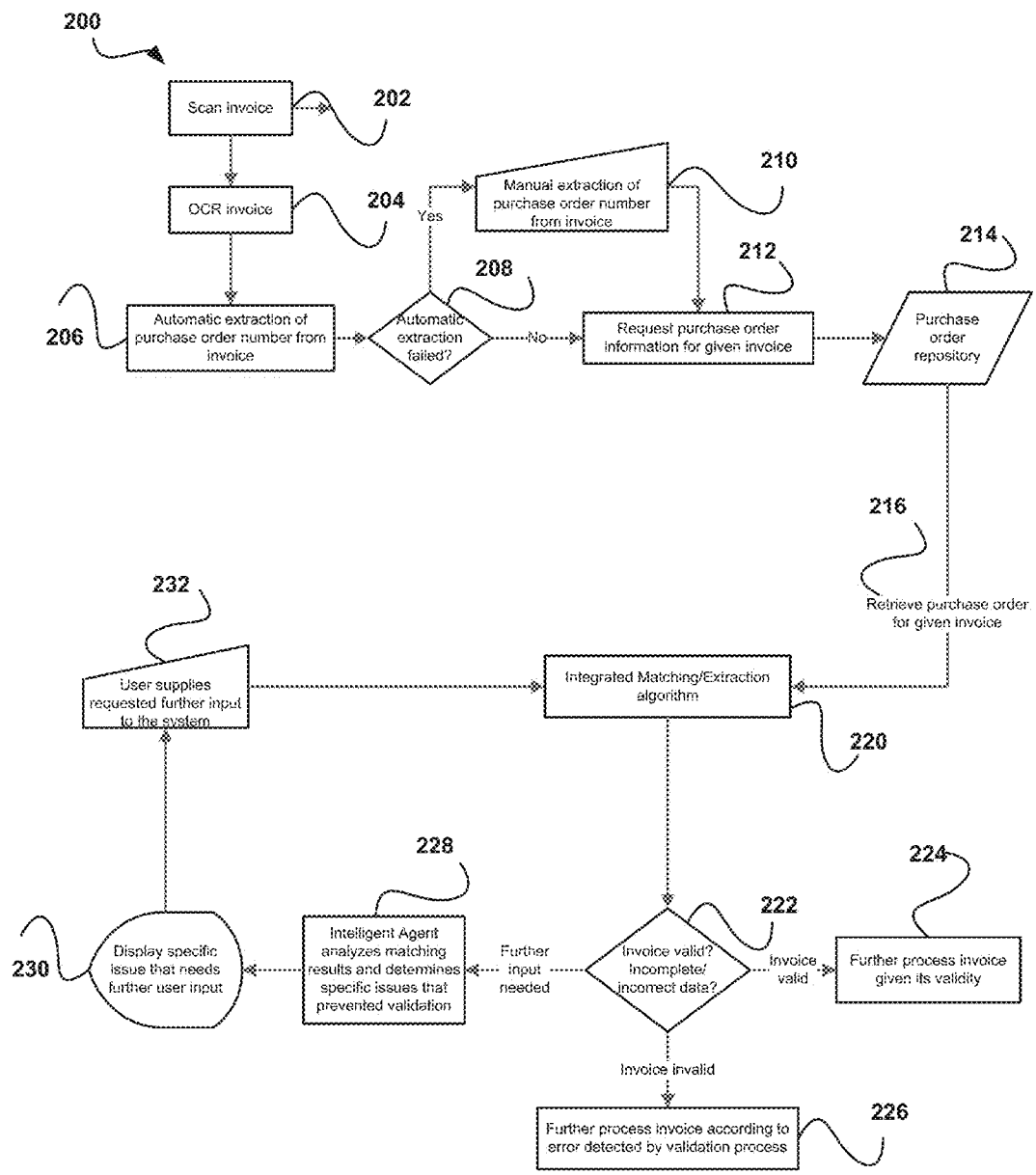
FIG. 2 is a method for determining a validity of an invoice in accordance with one embodiment of the present invention.

FIG. 2 shows a method 200 for determining a validity of an invoice, in accordance with another embodiment. As an option, the method 200 may be carried out in the context of the architecture and environment of FIG. 1. Of course, however, the method 200 may be carried out in any desired environment.

As shown in operation 202, an invoice is scanned. Additionally, in operation 204 the scanned invoice is OCRed. Further, in operation 206 an attempt is made to extract a purchase order number and/or a seller address from the invoice. In one embodiment, the extraction may be for purposes of identifying a purchase order corresponding to the invoice. In another embodiment, the extraction may be performed by a simple extractor.

In operation 208, it is determined whether the automatic extraction has failed. If it has, in operation 210 the purchase order number and/or the seller address are manually extracted from the invoice.

Additionally, if in operation 208 it is determined that the automatic extraction has not failed, in operation 212 purchase order information is requested for the given invoice from a purchase order repository 214. For example, the purchase order information may be requested from an ERP system.

Further, in operation 216 the purchase order for the given invoice is retrieved from the purchase order repository 214. In on embodiment, a set of purchase orders may be retrieved for the given invoice.

Also, the purchase order for the given invoice retrieved in operation 216 as well as the scanned and OCRed invoice are processed utilizing an integrated matching and extraction algorithm 220 which performs integrated iterative invoice validation. In one embodiment, line item information may be automatically identified and validated from the scanned and OCRed invoice by the integrated matching and extraction algorithm 220. For example, unit price, quantity, description of line item, and line item price, in addition to a subtotal charge, a tax charge, a shipping and handling charge, and a total price may be automatically identified and validated from the invoice. In another example, a statistical extractor may be run over the invoice. The statistical extractor may provide information about extracted data such as the unit price, quantity, description, line item price, etc.

In addition, it is determined by the integrated matching and extraction algorithm 220 in operation 222 whether the invoice is valid. For example, it may be determined whether the invoice contains incomplete or incorrect data. If it is determined in operation 222 that the invoice is valid, then in operation 224 the invoice is further processed given its validity. If it is determined in operation 222 that the invoice is invalid, then in operation 226 the invoice is further processed according to one or more errors detected by the validation process.

However, if it is determined in operation 222 that further input is needed, in operation 228, an intelligent agent analyzes any matching results and determines specific issues that prevented validation. Additionally, in operation 230 specific issues resulting from the analysis by the intelligent agent in operation 228 that need further input from a user are displayed. Further, in operation 232 the user supplies any requested further input, and this further input is in turn processed utilizing the integrated matching and extraction algorithm 220 along with the information extracted in operation 220 and the purchase order for the given invoice retrieved in operation 216.

For example, in the event that the invoice cannot be automatically validated, the system may request additional information from the user by prompting the user to correct and validate OCRed data and extraction results for specific fields on the invoice that prevented the automatic validation of the invoice. The corrected and validated information may then be fed back to the integrated matching and extraction algorithm 220 in order to reevaluate the validity of the invoice given the additional information. As an option, this process may be reiterated until the invoice is either validated or a serious problem with the invoice has been identified that makes the invoice invalid.

In another example, the system may automatically identify with high accuracy specific information on the invoice that prevents automatic validation. This may be achieved by the intelligent agent which analyzes matching hypotheses utilizing business rules. The intelligent agent may minimize the necessary input, which may result in highly efficient manual validation and correction.

As a result, the above method 200 offers many advantages when compared to other invoice validation approaches. For example, the above method 200 may provide zero set-up, and may allow for a substantially larger number of invoices that can be processed straight through without any human intervention. Additionally, the above method 200 may provide for accelerated manual validation and correction of OCR and extraction results, as well as an efficient identification of invalid invoices. In this way, it may be determined whether circumstances such as underdelivery, overdelivery, and overpricing are occurring based on one or more invoices without the need for a specialized employee to search or analyze such invoices.

Further, the above method 200 may provide for the simultaneous use of different sources of available information. By utilizing the knowledge from extraction, comparing it to the expectation of the purchase order, and checking against the applicable business rules, the above method 200 may yield improved extraction accuracy. In particular, line item extraction accuracy may be substantially improved. Further still, the above method 200 may provide for automatic OCR error correction as well as automatic data normalization. Also, since the above method 200 is an integrated process, any improvements may feed on each other. For example, improved OCR may result in improved extraction, which in turn may yield better matching, and so forth.

Figure 3:
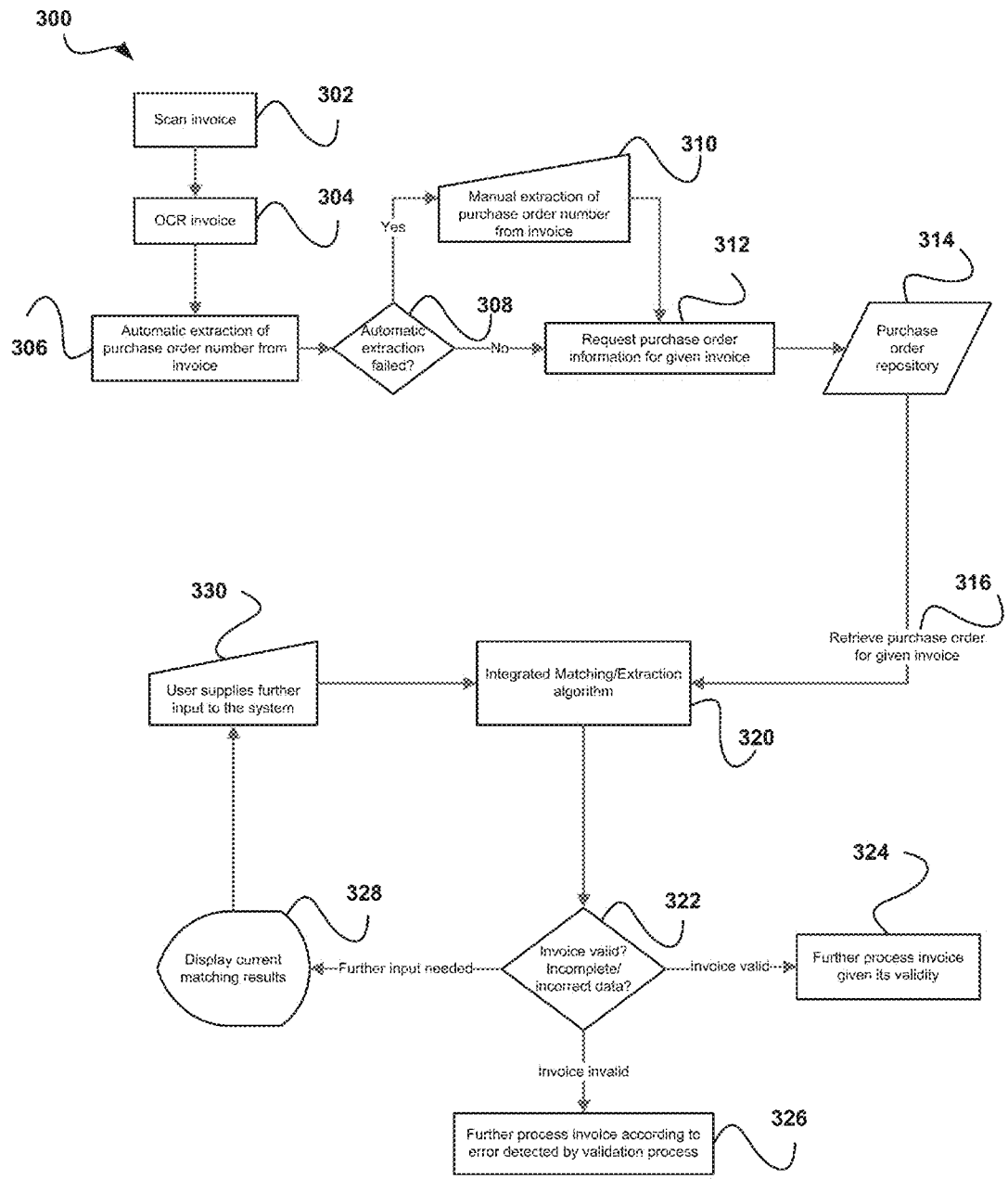
FIG. 3 illustrates a method for determining a validity of an invoice without the use of an intelligent agent in accordance with one embodiment of the present invention.

FIG. 3 shows a method 300 for determining a validity of an invoice without the use of an intelligent agent, in accordance with yet another embodiment. As an option, the method 300 may be carried out in the context of the architecture and environment of FIGS. 1 and/or 2. Of course, however, the method 300 may be carried out in any desired environment.

As shown in operation 302, an invoice is scanned. Additionally, in operation 304 the scanned invoice is OCRed. Further, in operation 306 an attempt is made to extract a purchase order number and/or a seller address from the invoice. In operation 308, it is determined whether the automatic extraction has failed. If it has, in operation 310 the purchase order number and/or the seller address are manually extracted from the invoice.

Additionally, if in operation 308 it is determined that the automatic extraction has not failed, in operation 312 purchase order information is requested for the given invoice from a purchase order repository 314. For example, the purchase order information may be requested from an ERP system.

Further, in operation 316 the purchase order for the given invoice is retrieved from the purchase order repository 314. In on embodiment, a set of purchase orders may be retrieved for the given invoice.

Also, the scanned and OCRed invoice, as well as the purchase order for the given invoice retrieved in operation 316, are processed utilizing an integrated matching and extraction algorithm 320 which performs integrated iterative invoice validation. In addition, it is determined by the integrated matching and extraction algorithm 320 in operation 322 whether the invoice is valid. For example, it may be determined whether the invoice contains incomplete or incorrect data.

If it is determined in operation 322 that the invoice is valid, then in operation 324 the invoice is further processed given its validity. If it is determined in operation 322 that the invoice is invalid, then in operation 326 the invoice is further processed according to one or more errors detected by the validation process.

However, if it is determined in operation 322 that further input is needed, in operation 328, current matching results are displayed. Additionally, in operation 330 a user supplies further input into the system, and this further input is in turn processed utilizing the integrated matching and extraction algorithm 320 along with the information extracted in operation 320 and the purchase order for the given invoice retrieved in operation 316.

In one embodiment, the validity of the invoice may be determined by simultaneously leveraging information from OCR, information from extraction, matching to a purchase order, business rules, and potentially manually validated information. An example of an algorithm used for this integrated matching process is described in the embodiment below.

In the context of the current embodiment, a position includes a purchase order position, an invoice line includes a physical line on an invoice, and a line-item includes a description of a specific good delivered and the corresponding charges. Additionally, a line-item field includes a component of a line-item with a particular meaning, for example, description of the goods delivered, unit price, quantity and/or extended price. Further, the description includes the specific line-item field that describes the goods delivered. Also, a position match candidate (PMC) includes a combination of line-items that is a candidate to match to a purchase order position. In one embodiment, PMCs may map one to one to positions, whereas line-items do not necessarily have a one to one mapping to positions.

The matching and extraction algorithm validates invoices by comparing the information given on an invoice with the corresponding purchase order. To this end the algorithm performs the following tasks. First, the algorithm validates line-items by associating the line-items on a given invoice with the open purchase order positions of this invoice. Additionally, the algorithm validates the invoice by checking the consistency of the invoice given the extracted values for total, subtotal, taxes as well as other additional charges like shipping and handling against the sum of the validated line-items. Further, the algorithm outputs a score that indicates the validity of the invoice as well as the best association as determined by the algorithm of the line-items and their fields to the purchase order positions.

The algorithm generates a list of matching hypotheses. In one example, a matching hypothesis is a possible association of the line-items and their respective fields to the list of open purchase order positions as well as possible values for total, subtotal, tax and other additional charges necessary to validate the invoice. The algorithm determines for each of the generated hypotheses an overall cost of the association and validation. The hypothesis with the lowest cost is elected as the final result.

The cost may be based on different sources of information. For example, the algorithm may utilize OCR results and a confidence of characters. Additionally, the algorithm may utilize extractor results, e.g. a list of possible label assignments and the associated confidences for every token on the invoice. Further, the algorithm may utilize user provided input such as correction of OCR and extraction results, as well as purchase order information and business rules.

Matching hypotheses are generated in a two-step process. The first step forms a set of PMCs from the invoice line-items. However, a complicating factor here is that line-items may not necessarily map one to one to positions. On occasion, several line-items may map to the same position. Additionally, in one embodiment, several positions may map to the same line-item. Accordingly, the algorithm generates PMCs by combining line-items given the extraction and OCR results. Additionally, in yet another embodiment, line item match candidates (LIMCs) may be created from the set of positions in order to handle the case where several positions map to the same line item.

The second step finalizes the creation of the matching hypothesis by electing a specific one to one mapping of the generated PMC set to the positions and the resulting validation. In another approach, a specific one to one mapping of the generated LIMC set to the line items is selected. In yet another approach, a combination of the foregoing may be used.

For simplicity, the following will refer to PMCs, though it is to be understood that similar methodology may be applied to use of LIMCs and/or the combination of PMCs and LIMCs. The overall cost c of the matching hypothesis is the sum of the individual costs of the two steps, as shown in Table 1.

TABLE 1

$c = cPMC + cMAP$

As shown in Table 1, cPMC indicates the cost of generating a specific set of PMCs and cMAP is the cost associated with a specific one to one mapping of the generated PMC set to positions and the validation of the invoice. The cost cPMC is factored into the following sum, as shown in Table 2.

TABLE 2

$cPMC = cprior + cline + cextraction + cOCR + csequence + calignment$

The different costs cprior, cextraction, cOCR, csequence, calignment and cline are defined as shown in Table 3.

TABLE 3 cprior: Cost associated with a specific combination of line-items. It is a heuristic cost containing prior knowledge regarding the combination of line-items. For example the combination of line-items that appear in consecutive order on the invoice is preferred over the combination of nonconsecutive line-items.
cline: The logarithmic sum of the probabilities of the line-items used for the current PMC set to be line-items versus generic invoice lines. The probabilities are based on the different format of line-items compared to generic invoice lines.
cextraction: The logarithmic sum of extraction probabilities of the tokens that have been assigned the labels description, quantity, unit price and extended price for the current PMC set.
cOCR: The tokens assigned the labels quantity, unit price and extended price by the current PMC set have to fulfill the constraint that quantity times unit price equals extended price. The cost cOCR is the cost associated with fulfilling this algebraic constraint given the OCR confidences of the different characters in these tokens.
csequence: This cost captures the prior knowledge that some sequences of line-item fields are more likely than others. For example it is unlikely to observe on an invoice that extended price is the first line-item field on a line-item followed by unit price, quantity and finally description, whereas the sequence description, quantity, unit price and extended price is quite common for a line-item.
calignment: Cost that reflects the observation that line-item fields tend to be aligned vertically The mapping cost cMAP of the second step is shown in Table 4.

TABLE 4

$cMAP = cmatch + cvalid$

The variable cmatch represents the total cost of the one to one mapping of the current PMC set to the positions. It is the sum over the individual matching costs of matching a single PMC to a position. The single matching costs are derived from the cost of fuzzy matching the individual line-item fields description, quantity, unit price, and extended price to the corresponding entries in the position. The fuzzy matching takes into account the OCR confidence of the individual characters in the extracted line-item fields.

The variable cvalid represents the cost that determines the validity of the invoice given the elected one to one mapping of the current PMC set to positions and checking this information against additional information extracted from the invoice according to predefined business rules. For example, the default business rule may be that the sum of the extended prices of the current PMC set balances with the extracted values for invoice subtotal, invoice total, tax, and additional extracted charges like shipping and handling. The cost may be based on the extraction probabilities of the extracted values and the associated OCR confidences of the individual characters.

The number of matching hypotheses grows in a factorial manner depending on the number of line-items as well as positions. Accordingly, an exhaustive search for the best matching hypothesis becomes quickly unpractical for invoices with more than a dozen of line-items and positions when using prior art methods. The developed algorithm approximates the search efficiently and effectively. The elected approach is described in the following paragraphs.

The number of possible PMC sets is factorial in the number of line-items. Similarly, the number of possible one to one mappings to positions given a specific PMC set is factorial in the number of positions and line-items. Accordingly, the number of resulting possible matching hypotheses is a factorial number of PMC sets combined with an factorial number of mappings making, as mentioned above, an exhaustive search of the matching hypothesis space unpractical using prior art methods.

Searching the PMC set space independently from the mapping space would reduce the complexity of the search. However, this approach yields suboptimal associations of line-items to positions. It applies too severe restrictions on the matching hypothesis search space leading to local optima. An illustrative example is an invoice with a rarely observed layout of line-items. In this instance the best guess for extracted line-item fields is likely to be systematically wrong. Still, the additional costs in cPMC do not sufficiently constrain the problem to overcome the wrong extraction results and, thus, ultimately yield a wrong association of line-items to positions. In this case, the simultaneous analysis of the information contained in the mapping cost cMAP is necessary to resolve the problem.

The elected algorithm searches the PMC set space and the mapping space simultaneously. It copes with the combinatorial growth of the search space given the number of line-items and positions by leveraging a priori knowledge of the specific problem. For example, an exhaustive search of all possible mappings given a specific PMC set is unnecessary. At that point the problem is sufficiently constrained and a greedy search for the best mapping is sufficient. On the other hand a greedy search for the best PMC set tends to yield a suboptimal association of line-items to positions. The final strategy adopted for the search is to apply a restricted combinatorial search of the PMC set space and to combine it with a greedy search for the best mapping given a specific PMC set. The algorithm uses stochastic annealing for the restricted combinatorial search of the PMC set space.

TABLE 5

Algorithm 1 Matching algorithm to find best association of line-items to purchase order positions.

Require: Positions P for given invoice.
Require: Invoice I. I contains the tokens of the invoice together with their (x, y) positions as well as their corresponding OCR and extraction results.
  1: I := updateInvoice(I) {Depending on additional external input update information contained in I. For example user provided validation or correction of line-item fields and OCR results.}
  2: (M, setOfPMCs, $c_{MAP}$, $c_{PMC}$) := initializeMatchingHypothesis(P, I) {The procedure initializeMatchingHypothesis elects an initial set of PMCs setOfPMCs and determines its best mapping M to positions. It returns the initial matching hypothesis (M, setOfPMCs) and its cost $c_{PMC}$ and $c_{MAP}$.}

TABLE 5-continued

Algorithm 1 Matching algorithm to find best association of line-items to purchase order positions.

3: bestMatch := (M, setOfPMCs) {Current best association of line-items to positions.}
  4: minCost := $c_{PMC}$ + $c_{MAP}$ {Current best cost associated with bestMatch.}
  5: while minCost improves sufficiently do
  6:   ($c_{PMC}$, setOfPMCs) := nextPMC($c_{PMC}$, setOfPMCs, I) {Generate next PMC set and its cost using stochastic annealing.}
  7:   ($c_{MAP}$, M) := findMap(setOfPMCs) {Find best mapping M for setOfPMCs and its cost $c_{MAP}$ using greedy search.}
  8:   c := $c_{PMC}$ + $c_{MAP}$ {Overall cost c of current matching hypothesis given by setOfPMCs and M.}
  9:   if c < minCost then
 10:     minCost := c
 11:     bestMatch := (M, setOfPMCs)
 12:   end if
 13:   updateAnnealingSchdedule( ) {Procedure that monitors the changes in the individual costs that constitute the cost $c_{PMC}$ and their relation with the overall cost c. It updates the annealing schedules needed in the routine nextPMC accordingly.}
 14: end while Table 5 describes the aforementioned process in more detail. It starts with a matching hypothesis by generating an initial PMC set and associating the individual PMCs greedily to positions. The main loop of the algorithm tries to improve on the initial matching hypothesis by iterating through the matching hypothesis space. Within each iteration of the main loop the algorithm chooses a PMC set using stochastic annealing and determines its best mapping to positions using a greedy search. The algorithm terminates when the improvement of the overall cost c becomes marginal.

TABLE 6

Algorithm 2 Routine nextPMC.

Require: Input PMC set setOfPMCs.
Require: Cost $c_{PMC}$ of setOfPMCs.
Require: Invoice I.
  1: (modCombo, cost) := modifiedLineItemCombination(setOfPMCs, I) {Procedure that randomly add/removes line-items and their combination according to the cost $c_{prior}$, $c_{line}$ and the annealing schedule. It returns a modified combination modCombo of line-items and the new cost for $c_{prior}$ and $c_{line}$.}
  2: ($c_{PMC}$, setOfPMCs) := modifiedPMCs(setOfPMCs, I) {Procedure that changes randomly labels of some of line-item fields according to the cost $c_{extraction}$, $c_{OCR}$, $c_{sequence}$, $c_{alignment}$ and the annealing schedule. It returns the modified set of PMCs setOfPMCs and its new cost $c_{PMC}$.}

Table 6 illustrates the procedure for iteratively generating the PMC set. A modified PMC set is generated by first making small changes to the current combination of line-items and the considered set of line-item candidates. The changes are sampled according to the costs cprior and cline. Given the current annealing temperature elected changes with a higher cost cprior+cline are sometimes accepted. In a second step the labels of some line-item fields are randomly modified using the costs cextraction, cOCR, csequence, calignment and the current annealing temperature.

While the present invention has been illustrated and described with reference to specific embodiments, further modification and improvements will occur to those skilled in the art. It is to be understood, therefore, that this invention is not limited to the particular forms illustrated and that it is intended in the appended claims to cover all possible modifications of the teachings herein.

The present description is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication. In addition, various combinations of wired, wireless (e.g., radio frequency) and optical communication links may be utilized.

The program environment in which a present embodiment of the invention is executed illustratively incorporates one or more general-purpose computers or special-purpose devices such as facsimile machines and hand-held computers. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Figure 4:
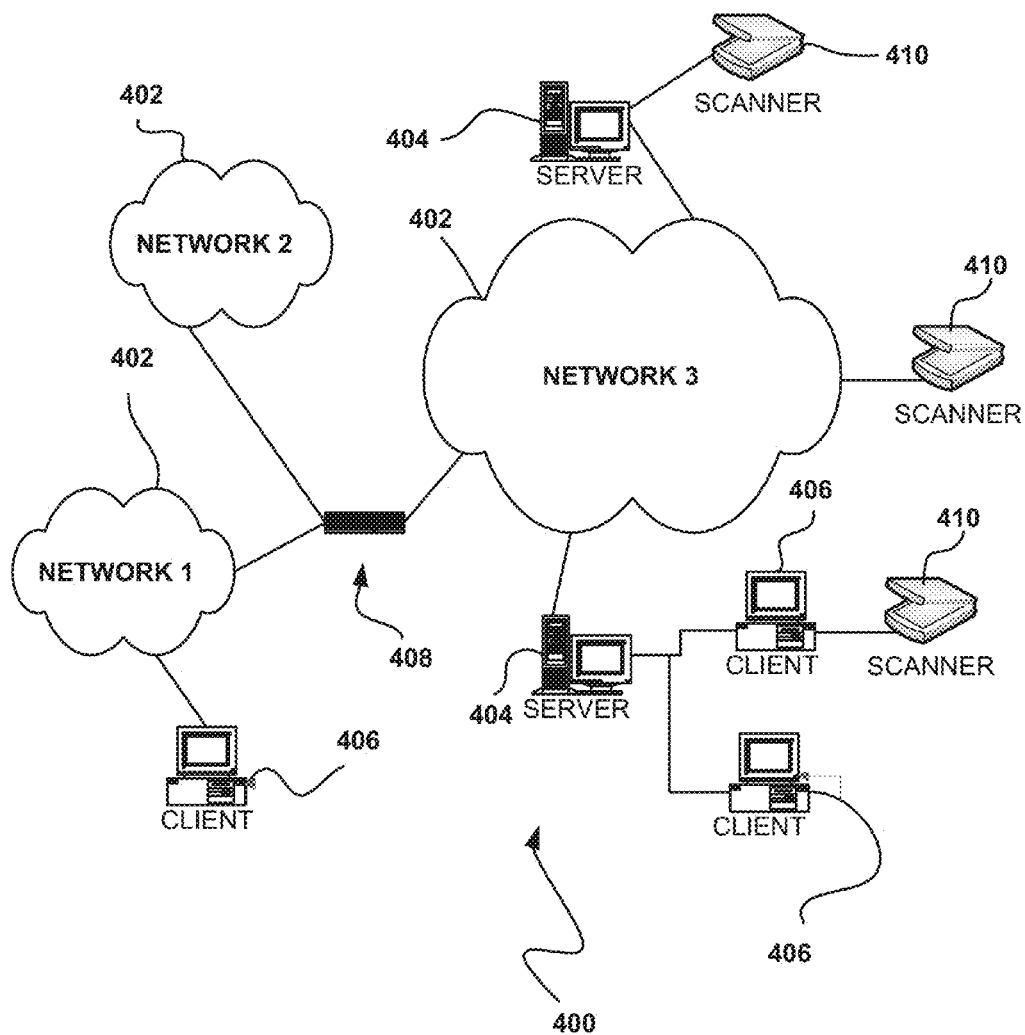
FIG. 4 illustrates a network architecture, in accordance with one embodiment.

FIG. 4 illustrates a network architecture 400, in accordance with one embodiment. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 402, at least one gateway 408 is optionally coupled therebetween.

One or more scanners 410 may be coupled to a network, a server 404 and/or a client 406. The scanner(s) 410 may be accessible by the attached machine and/or remotely by other machines via any interconnection path.

Figure 5:
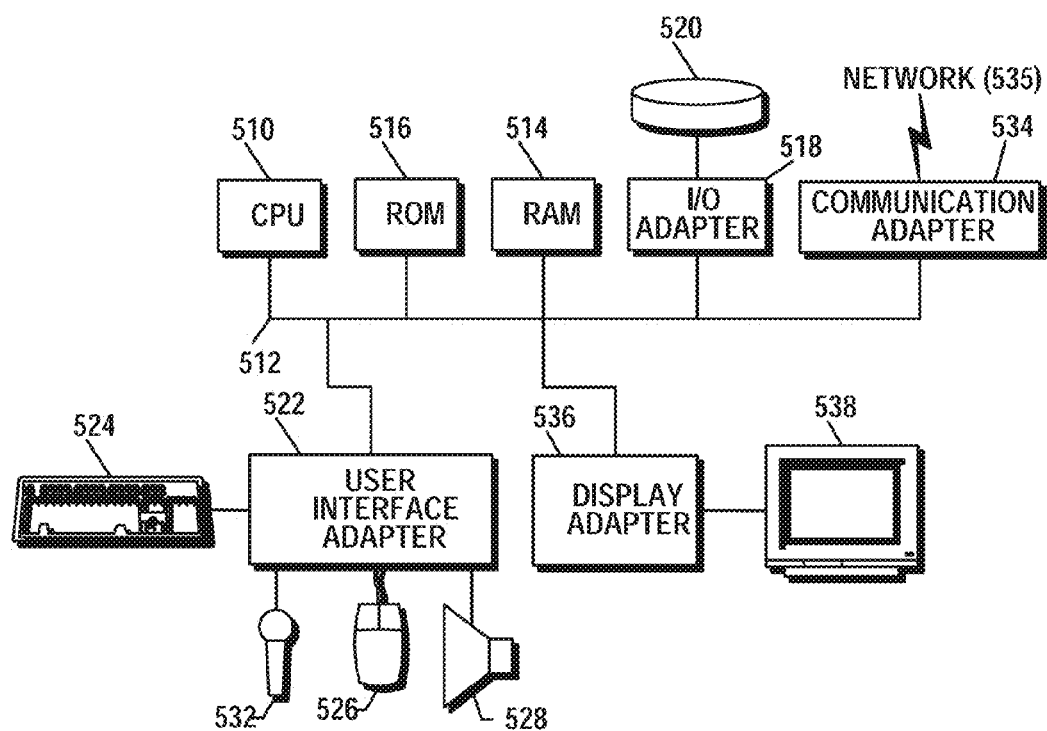
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Mobile Device Implementation

In still more approaches, the presently disclosed inventive concepts may be embodied in, practiced using, and/or applied to mobile technology and/or mobile devices. As referred-to herein, a mobile device should be understood to include any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

Similarly, while various embodiments have been described herein as employing a scanner, or involving "scanning" a document, image, etc., it should be understood that the concepts are equally applicable to mobile devices. For example any "scanning" operation discussed herein may be applied to a mobile device and/or mobile computing environment. In one approach, capturing an image uses a mobile device camera rather than "scanning" the image or document.

Those having ordinary skill in the art will appreciate that image data generated using a scanner and image data generated using a camera may have unique aspects or characteristics in some approaches. For example, an image captured using a mobile device camera may include artifacts such as skew, perspective distortion (such as apparent warping or curvature in a truly flat or straight surface/edge), illumination, blur, etc. as would be understood by one having ordinary skill in the art upon reading the present descriptions. Nonetheless, the presently described inventive concepts should be understood as being equally applicable to both traditional scanners and associated computing equipment/resources, as well as mobile capture devices and/or processing devices, in illustrative embodiments.

In various embodiments, the presently disclosed methods, systems and/or computer program products may optionally utilize and/or include any of the functionalities disclosed in related U.S. Pat. No. 8,855,375, filed Jan. 11, 2013, U.S. patent Ser. No. 13/948,046, filed Jul. 22, 2013; U.S. Patent Publication No. 2014/0270349, filed Mar. 13, 2013; U.S. Patent Publication No. 2014/0270536, Filed Mar. 13, 2014; and U.S. Pat. No. 8,885,229, filed May 2, 2014. Exemplary types of "data of interest" and "documents" envisioned for use in conjunction with the presently described inventive concepts may include any type of "information" (e.g. identifying information, financial information, biographical information, geographical information, etc.) and/or document (e.g. identifying document, legal documents, medical documents, etc.) as disclosed in related U.S. patent application Ser. No. 14/220,029, filed Mar. 19, 2014, which is herein incorporated by reference.

Device and Expectation-Based Validation

Turning now to validation based on a-priori expectations and mobile devices as the source of reference information, several exemplary embodiments will be described.

First, device-based validation is to be understood as techniques of validating data extracted from documents, validating documents per se, etc. based on reference information that is stored within the mobile device.

Preferably, the reference information comprises an immutable or substantially immutable identifier of the mobile device, such as a mobile device name, serial number, MAC address, mobile identification number (MIN), mobile subscription identification number (MSIN), mobile equipment identifier (MEID), electronic serial number (ESN), international mobile equipment identity (IMEI), etc. as would be understood by one having ordinary skill in the art upon reading the present descriptions.

An identifier should be considered "immutable" or "substantially immutable" when the identifier is not subject to facile modification by the user. For example, an identifier that cannot be modified without changing hardware is to be considered immutable or substantially immutable within the scope of the present disclosures. Similarly, an identifier that cannot be modified without changing or modifying the mobile device operating system (OS), e.g. updating, reinstalling, restoring, installing a new mobile OS, etc.) is to be considered immutable or substantially immutable within the scope of the present disclosures. Further still, an identifier that is not subject to modification without changing a service or service provider associated with the mobile device is to be considered immutable or substantially immutable within the scope of the present disclosures. Other examples and equivalents of immutable or substantially immutable identifiers will become clear to persons having ordinary skill in the art upon reading the present descriptions.

The reference information may be stored in any suitable location and any suitable form on the mobile device. For example, the reference information may be stored in a database, lookup table, or other similar data structure in-memory on the mobile device. Preferably, the reference information is stored at the OS level such that the reference information may be quickly and easily retrieved for subsequent comparison without invoking significant memory resources. For example, in particularly preferred embodiments the reference information is accessible to the OS in a similar manner as data provided from the various mobile device sensors (e.g. gyroscope, accelerometer, compass, etc.) to the mobile OS and associated mobile applications.

In addition and/or alternative to the OS-level access, a mobile application configured to perform the presently disclosed device- and expectation-based validation techniques may include and/or be communicatively coupled to a database lookup table, or other similar data structure stored in memory in association with the mobile device.

In order to reduce computational cost and performance time associated with document-based validation and remote data-based validation, the presently disclosed device-based validation concepts most preferably perform validation utilizing reference information that is locally accessible to the mobile application/function performing validation. The reference information is preferentially stored in a memory of the mobile device.

Reference information may include and/or be stored in association with information other than the exemplary "immutable" or "substantially immutable" identifiers noted above. For example, in various embodiments immutable or substantially immutable identifiers may be stored in association with any type of suitable identifying information, e.g. information typically depicted on identifying documents such as driver's licenses, passports, birth certificates, social security cards, tax forms, etc. as would be understood by a person having ordinary skill in the art upon reading the present descriptions.

Expectation-based validation may be considered inclusive of device-based validation, but is not limited to validation based on information associated with the mobile device. Rather, expectation-based validation encompasses any type of validation based on a priori knowledge or hypotheses regarding the content and/or form of an expected data gathering operation (e.g. extraction from an image). Otherwise, all concepts regarding device-based validation discussed above should be understood as included within the scope of expectation-based validation and may be utilized in combination therewith, according to various embodiments.

For example, in one approach expectation-based validation independent of device-based validation includes normalizing extracted information to fit a format expected by a mobile application, business workflow or transaction, etc. Normalization may be based on format of reference information, and/or predefined by the mobile application, workflow, transaction, etc. In one approach, a date of birth is depicted in one standard format on a document, but a transaction workflow requires a specific, different date format. The above scenario is also one example of how expectation-based validation may reflect business rules as defined by the transaction, workflow, application, etc.

In more approaches, expectation-based validation may be utilized to correct extraction errors, e.g. upon determining extracted data substantially but imperfectly match reference information. In response to such a determination, which is often indicative of an OCR error when mismatch is only one or a few characters, the mismatch may be corrected based on the reference information.

With the foregoing general concepts in mind, several exemplary embodiments of device-based and expectation-based validation will be discussed with reference to FIGS. 6-8. The exemplary embodiments are to be understood as nonlimiting, illustrative disclosures within the scope of the presently disclosed inventive concepts.

Data Extraction and Validation

In one exemplary embodiment, device-based validation may be utilized to facilitate data extraction and validation using mobile devices.

For instance, a mobile device has associated therewith various reference information, e.g. immutable identifiers, device name, phone number, etc. The reference information may include additional information such as contact information, etc. available to the mobile device and preferably stored on the mobile device memory.

A user of the mobile device wishes to extract data from a document, or otherwise capture image data and extract useful information therefrom. The user invokes a mobile application, etc. configured to capture and process image data and extract information therefrom, and captures information necessary to the mobile application, an associate workflow or transaction, etc. such as identifying information depicted on a driver's license or business card. Accordingly, the user captures an image of the appropriate information and an extraction process is utilized to obtain the necessary information from the image data.

However, the necessary information is imperfectly extracted from the image. For example the image may be blurred, the subject of the image may be complex or obscured, lighting conditions may be unsuitable to generate an image of sufficient quality, etc. While the necessary information is substantially correct, one (e.g. for a string of at least 5 characters) or a few characters (e.g. for a string of at least 15 characters) may be incorrectly recognized.

The error may be determined (or conversely, accuracy verified) by comparing the extracted information to reference information stored on the mobile device. In the exemplary scenario of a user extracting a name, phone number and address from a bill, the name may be compared with reference information such as a mobile device name of the mobile device utilized to capture the image, and/or with contact information stored on the mobile device memory.

Similarly, the address and phone number may be compared with contact information corresponding to a contact entry having a name substantially identical to the device name. The address and phone number comparison may be performed contemporaneous to the name comparison (e.g. all extracted items are compared against the contact information as reference information), or in series (e.g. extracted name is compared to the device name, and upon discovering a substantial match, the corresponding contact entry is located in memory and the address and phone number comparison are performed).

In the event of no mismatch between the extracted data and the reference information, the data extraction may be considered validated and any extracted data necessary to perform the transaction, workflow, etc. may be provided to the transaction, workflow, etc.

In the event of a slight mismatch, within predefined tolerance levels, the extracted data may be normalized and/or modified to correct errors and/or meet workflow expectations (e.g. format) as generally described herein. The data extraction may then be considered validated and any extracted data necessary to perform the transaction, workflow, etc. may be provided to the transaction, workflow, etc.

Figure 6:
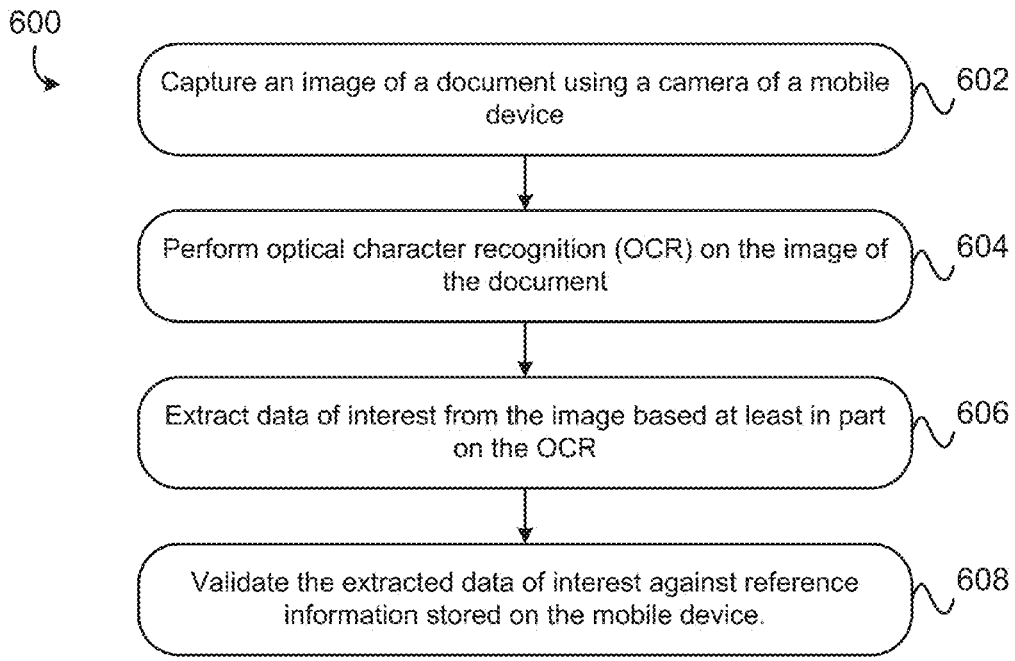
FIG. 6 is a flowchart of a method for data validation, according to one embodiment.

Accordingly, in one embodiment, an data extraction and validation process is represented in FIG. 6, via method 600. The method 600 may be performed in any suitable environment, and is preferentially implemented via a mobile device.

As shown, method 600 includes operation 602, in which an image of a document is captured using a camera of a mobile device. The image may be captured in any suitable form, or using any suitable capture software and preferably includes capture software configured to process images captured using mobile devices.

Method 600 also includes operation 604, where optical character recognition (OCR) is performed on the document image, generating a list of extraction candidates.

Further, method 600 includes extracting data of interest from the image based at least in part on the OCR result in operation 606. Data extraction may be accomplished using any suitable technique as described herein or equivalents thereof that would be understood by a person having ordinary skill in the art upon reading the present descriptions.

As shown, method 600 also includes operation 608, where the extracted data of interest are validated against reference information stored on the mobile device.

The method 600 may additionally and/or alternatively include further functions and features such as determining at least some of the data of interest were imperfectly extracted from the image; and validating the imperfectly extracted data of interest against reference information stored on the mobile device. For example, imperfect extraction may be indicated by the presence of an OCR error (or likely error, e.g. as may be indicated by low OCR confidence for a particular extracted datum), by failure to complete OCR extraction, by a deviation from expected OCR results (e.g. a value outside a permitted OCR alphabet, such as a numeral result where only alphabetic characters are expected), etc.

Moreover, validating the imperfectly extracted data further comprises at least one of: correcting OCR errors in the imperfectly extracted data of interest based in whole or in part on at least one of the reference information and predefined business rules, and normalizing data from the document based at least in part on at least one of the reference information and the predefined business rules.

As noted above, the validation may include expectation-based validation, but preferably also involves device-based validation. Expectation-based validation and device-based validation may be considered a single basis for validation when the expectation upon which the validation is based relies upon device information as the reference information, in one embodiment.

Thus, in various approaches, reference information preferably includes an immutable or substantially immutable identifier of the mobile device. For example, the immutable or substantially immutable identifier preferably includes one or more of: a mobile device name, a telephone number associated with the mobile device, a mobile device serial number, a mobile device MAC address, mobile identification number (MIN), mobile subscription identification number (MSIN), mobile equipment identifier (MEID), electronic serial number (ESN), international mobile equipment identity (IMEI).

Of course, reference information may include information beyond immutable or substantially immutable device identifiers, such as where the reference information comprises contact information stored on the mobile device. In such approaches, the reference information preferably further comprises an immutable or substantially immutable identifier of the mobile device. Thus, the contact information is stored on the mobile device in association with the immutable or substantially immutable identifier.

Of course, as will become clear upon reading the additional disclosures below, data validation may also include, or be employed in the alternative to, validation of the document itself, without departing from the scope of the present disclosures.

Document Validation

In more approaches, it is advantageous to validate the document itself in addition to or instead of data extracted therefrom. For example, it may be particularly useful in one approach to validate the authenticity of a document prior to attempting extraction. It may be further advantageous to then utilize the reference information to facilitate extraction and validation of data of interest from the authenticated document e.g. an identifying document.

In practice, document validation may be substantially similar to data validation as described above and shown in FIG. 6. However, rather than validating the extraction process and ensuring accuracy/reliability thereof, the extraction may be presumed accurate and compared against reference information to provide an indication of validity of the document.

While data extraction and validation is particularly useful in situations where reliability or accuracy of extraction is in question, e.g. for poor image capture conditions and/or difficult documents (complex backgrounds, similar foreground and background, etc.), skilled artisans will appreciate that document validation is conversely useful in situations where extraction reliability or accuracy are not in question, and may thus serve to validate the document rather than the extraction process.

For example, in one scenario a user wishes to conduct a business transaction using a mobile device, and the business transaction requires certain information such as tax information. To provide the tax information, the user may capture an image of a tax document depicting one or more identifiers, such as the user's name or social security number. The identifiers may be extracted from the image, and compared to reference information to validate the document. For example, reference information such as a device name "John Doe's iPhone" may be compared to a name extracted from an image of a tax return. Similarly, a social security number may be stored in memory in the mobile device (preferably in association with an immutable or substantially immutable device identifier) and compared to a social security number extracted from the tax return image. If the comparison reveals the device name matches the extracted name, and/or the stored social security number matches the extracted social security number, the document may be considered validated and additional information extracted therefrom to complete the business transaction.

Other exemplary embodiments may validate a document such as a business card based on name, address, and/or phone number depicted on the business card as compared, e.g. to contact information stored in memory on the mobile device (again, preferably in association with an immutable or substantially immutable device identifier). Skilled artisans reading the present descriptions will appreciate other applicable scenarios in which reference information stored on the mobile device may be leveraged to validate documents in the course of business transactions to advantageously provide security in the authenticity of the data extracted therefrom using mobile devices.

Figure 7:
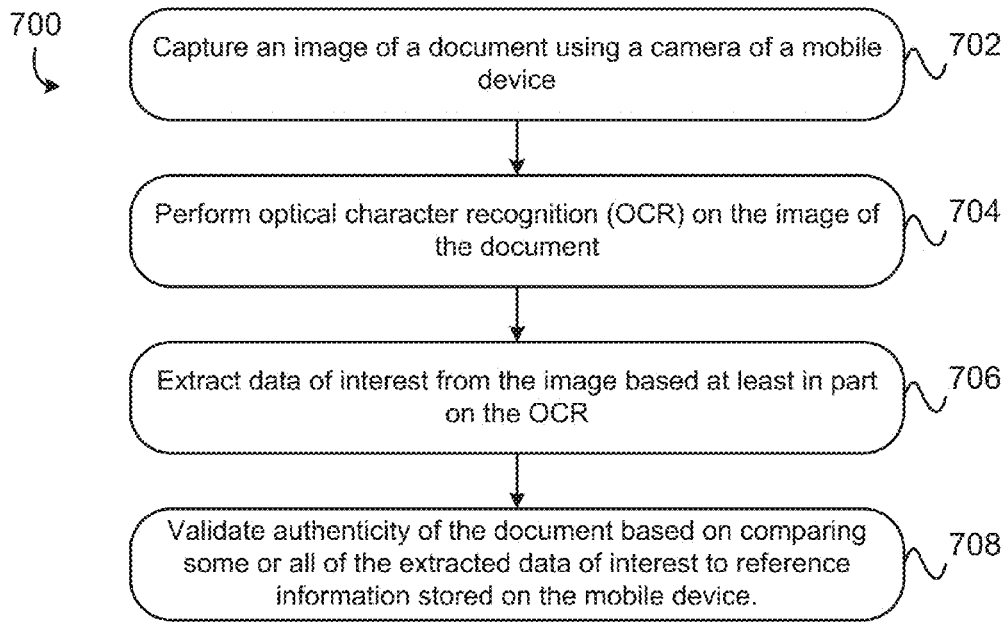
FIG. 7 is a flowchart of a method for document validation, according to one embodiment.

Accordingly, in one embodiment, an exemplary document validation process is represented in FIG. 7, via method 700. The method 700 may be performed in any suitable environment, and is preferentially implemented via a mobile device.

As shown, method 700 includes operation 702, in which an image of a document is captured using a mobile device.

Method 700 also includes operation 704, in which OCR is performed on the captured image of the document.

Further, method 700 includes extracting data of interest from the image based on the OCR, in operation 706.

As shown, method 700 also includes operation 708, where authenticity of the document is validated based on comparing some or all of the extracted data of interest to reference information stored on the mobile device.

Of course, document validation may be combined with data validation in various embodiments without departing from the scope of the present disclosures. Moreover, either or both validation technique(s) may be employed in conjunction with device-based identity validation, as will be described in further detail below.

Device-Based Identity Validation

In more embodiments, it is possible to provide additional security in the course of a transaction based on device validation. In essence, a unique identifier associated with the device may serve as a point of validating the fact that a transaction is being conducted using a mobile device known to be associated with a particular user.

Reference information suitable for validation as described herein may be stored in association with an immutable or substantially immutable device identifier. The reference information stored in association with the device identifier is preferably depicted on a document expected or known used to provide data of interest to a mobile application, but may include any information likely or possible to appear on a document used to provide the data of interest. For economy of memory, a restricted set of ubiquitous reference information is preferred, such as a user's name, social security number, date of birth, partial or complete address, tax ID number, an employer identification number, etc. as would be understood by one having ordinary skill in the art upon reading the present descriptions.

In the simplest example, reference information such as a mobile device owner's name is associated with an immutable identifier such as an IMEI. Subsequently, the mobile device is used to conduct a business transaction or other operation using the mobile device that requires identity verification. To provide an extra layer of identity security, it is advantageous to verify both the identity of the device and the identity of the user in conjunction, and test these verified facts against the stored reference information and associated mobile device identifier.

For instance, the user engaging in the business transaction may be directed to capture an image of their driver's license. The name on the driver's license is extracted, and the IMEI for the mobile device used to perform the capture operation is obtained from the mobile device itself. These two facts may be compared against the previously-stored device owner name and associated IMEI to verify that the device being used to perform the capture operation (and hence the business transaction or other operation) and named driver's licensee are the same as the IMEI and named mobile device owner previously stored. In this manner, it is possible to provide an additional layer of verification that the individual conducting the business transaction is the mobile device owner (or at least is acting with permission of the device owner) since the individual is ostensibly in possession of the owner's driver's license (or other sensitive documentation).

Of course, a name comparison based on a driver's license alone a simplified example. Various features of any document suitable for authenticating user identity may be utilized in any combination to provide the aforementioned security benefits. For example various text depicted on a document may be used in conjunction to enable robust authentication, preferably including a unique identifier such as a driver's license number. Similarly, image characteristics such as a photograph, seal, logo, emblem, etc. may be utilized to enable robust authentication.

Figure 8:
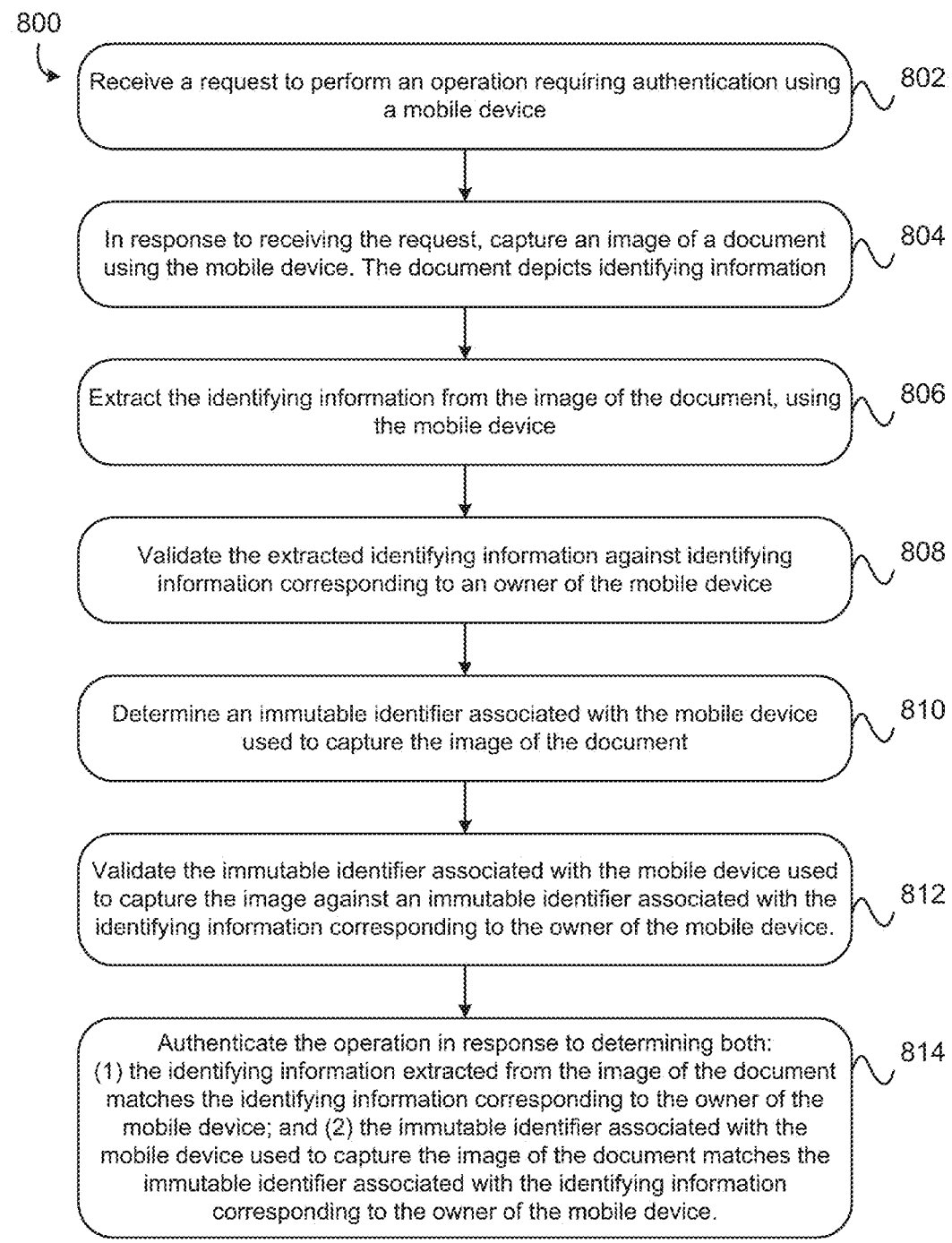
FIG. 8 is a flowchart of a method for identity validation, according to one embodiment.

Accordingly, in one embodiment, an exemplary device-based identity validation process is represented in FIG. 8, via method 800. The method 800 may be performed in any suitable environment, and is preferentially implemented via a mobile device.

As shown, method 800 includes operation 802, in which a request to perform an operation using a mobile device is received. The requested operation requires authentication prior to performance thereof.

Method 800 therefore also includes operation 804, in which an image of a document is captured using the mobile device, and in response to receiving the request. The imaged coument depicts identifying information, which preferably serves as a basis for part or all of an identity verification process.

Further, method 800 includes extracting the identifying information from the image of the document in operation 806. The extraction operation utilizes the mobile device, in preferred approaches.

As shown, method 800 also includes operation 808, where the extracted identifying information is validated against identifying information corresponding to an owner of the mobile device used to perform the capture operation, e.g. a device name, contact information, etc. as described above.

In operation 810, an immutable identifier associated with the mobile device used to perform the capture operation is determined.

In operation 812, the immutable identifier associated with the mobile device is validated against an immutable identifier associated with identifying information corresponding to the mobile device owner. By verifying immutable identifiers against immutable identifiers, it is possible to provide a two-level identity validation process, where some immutable feature of the device and the individual with whom the device is associated in an ownerhship capacity can be cross-validated. By coupling the device to the owner for validation purposes, it is possible to provide e.g. a limited user group and/or limited device group with permission to perform sensitive functions, such as handling of confidential information.

In any event, in operation 814 method 800 includes authenticating the requested operation in response to determining both that the identifying information extracted from the image of the document matches the identifying information corresponding to the owner of the mobile device; and the immutable identifier associated with the mobile device used to capture the image of the document matches the immutable identifier associated with the identifying information corresponding to the owner of the mobile device.

Of course, the various embodiments set forth herein may be implemented utilizing hardware, software, or any desired combination thereof. For that matter, any type of logic may be utilized which is capable of implementing the various functionality set forth herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving an image of a document at a mobile device;
performing optical character recognition (OCR) on the image of the document;
extracting data of interest from the image based at least in part on the OCR; and
validating the extracted data of interest against reference information stored on the mobile device;
wherein the validation comprises device-based validation;
wherein the device-based validation comprises normalizing the extracted data of interest to match a predetermined format; and
wherein the reference information comprises an immutable or substantially immutable identifier of the mobile device.

2. The method as recited in claim 1, further comprising determining at least some of the data of interest were imperfectly extracted from the image; and
validating the imperfectly extracted data of interest against reference information stored on the mobile device.

3. The method as recited in claim 2, wherein validating the imperfectly extracted data of interest further comprises at least one of:
correcting OCR errors in the imperfectly extracted data of interest based in whole or in part on at least one of the reference information and predefined business rules, and
normalizing data from the document based at least in part on at least one of the reference information and the predefined business rules.

4. The method as recited in claim 1, wherein the validation comprises expectation-based validation.

5. The method as recited in claim 1, wherein the predetermined format is a workflow-specific format.

6. The method as recited in claim 1, wherein the reference information comprises an immutable or substantially immutable identifier of the mobile device.

7. The method as recited in claim 6, wherein the immutable or substantially immutable identifier comprises one or more of: a mobile device name, a telephone number associated with the mobile device, a mobile device MAC address, a mobile subscription identification number (MSIN), a mobile equipment identifier (MEID), and an international mobile equipment identity (IMEI); and
wherein the validating comprises comparing the extracted data of interest to the immutable or substantially immutable identifier.

8. The method as recited in claim 1, wherein the reference information comprises contact information stored on the mobile device; and
wherein the reference information further comprises an immutable or substantially immutable identifier of the mobile device, and wherein the contact information is stored on the mobile device in association with the immutable or substantially immutable identifier.

9. The method as recited in claim 1, wherein the validation comprises device-based identity validation; and
wherein the device-based identity validation includes determining whether an individual conducting a transaction involving the extracted data of interest is an owner of a mobile device used to capture the image of the document.

10. The method as recited in claim 1, further comprising validating authenticity of the document based on determining an immutable identifier associated with a mobile device used to capture the image of the document matches an immutable identifier of the mobile device that received the image.

11. The method as recited in claim 1, further comprising:
determining the data of interest were imperfectly extracted from the image; and
correcting the imperfectly extracted data of interest using the reference information stored on the mobile device.

12. A computer-implemented method, comprising,
receiving an image of a document at a mobile device;
performing optical character recognition (OCR) on the image of the document
extracting data of interest from the image based at least in part on the OCR; and
validating the extracted data of interest against reference information stored on the mobile device; and
validating authenticity of the document based on determining an immutable identifier associated with a mobile device used to capture the image of the document matches an immutable identifier of the mobile device that received the image, wherein the validating the authenticity of the document further comprises:
generating at least one hypothesis mapping the document to reference information stored on the mobile device, wherein generating the at least one hypothesis is based at least in part on one or more of:
textual information from the document;
the reference information; and
predefined business rules;
determining a validity of the document based on the at least one hypothesis; and
outputting an indication of the determined validity.

13. A computer-implemented method, comprising:
receiving an image of a document at a mobile device;
performing optical character recognition (OCR) on the image of the document;
extracting data of interest from the image based at least in part on the OCR; and
validating the extracted data of interest against reference information stored on the mobile device; and
validating the document from which the data of interest were extracted, wherein validating the extracted data of interest and validating the document from which the data of interest were extracted comprise independent validation processes;
wherein determining the validity of the document comprises expectation-based validation and device-based validation; and
wherein the reference information comprises an immutable or substantially immutable identifier of the mobile device.

14. A method, comprising:
capturing an image of a document using a camera of a mobile device;
performing optical character recognition (OCR) on the image of the document;
extracting data of interest from the image based at least in part on the OCR; and
validating authenticity of the document based on comparing some or all of the extracted data of interest to reference information stored on the mobile device;
wherein the reference information comprises one or more immutable or substantially immutable device identifiers selected from a group consisting of: a mobile device name, a telephone number associated with the mobile device, a mobile device MAC address, a mobile subscription identification number (MSIN), a mobile equipment identifier (MEID), and an international mobile equipment identity (IMEI); and
wherein the validating further comprises:
generating at least one hypothesis mapping the document to reference information stored on the mobile device;
determining a validity of the document based on the at least one hypothesis; and
outputting an indication of the determined validity; and
wherein generating the at least one hypothesis is based at least in part on one or more of:
textual information from the document
the reference information; and
predefined business rules.

15. The method as recited in claim 14, further comprising:
determining the data of interest were imperfectly extracted from the image; and
correcting the imperfectly extracted data of interest using the reference information stored on the mobile device.

16. The method as recited in claim 14, further comprising normalizing the extracted data of interest based at least in part on the reference information and one or more predefined business rules.

17. A method, comprising:
receiving a request to perform an operation using a mobile device, the operation requiring authentication;
in response to receiving the request, capturing an image of a document using the mobile device, the document depicting identifying information corresponding to a person;
extracting the identifying information corresponding to the person from the image of the document using the mobile device;
validating the identifying information extracted from the image of the document and corresponding to the person against identifying information stored on the mobile device, the identifying information stored on the mobile device corresponding to an owner of the mobile device;
determining an immutable identifier associated with the mobile device used to capture the image of the document;
validating the immutable identifier associated with the mobile device used to capture the image of the document with an immutable identifier associated with the identifying information stored on the mobile device and corresponding to the owner of the mobile device; and
authenticating the operation in response to determining both:
the identifying information extracted from the image of the document and corresponding to the person matches the identifying information stored on the mobile device and corresponding to the owner of the mobile device; and
the immutable identifier associated with the mobile device used to capture the image of the document matches the immutable identifier associated with the identifying information stored on the mobile device and corresponding to the owner of the mobile device.

18. The method as recited in claim 17, wherein the immutable identifier associated with the mobile device is selected from a group consisting of: a mobile device name, a mobile device MAC address, a mobile subscription identification number (MSIN), a mobile equipment identifier (MEID), and an international mobile equipment identity (IMEI).

* * * * *